US009884253B2

(12) United States Patent
Navarro et al.

(10) Patent No.: US 9,884,253 B2
(45) Date of Patent: Feb. 6, 2018

(54) USING A DATA STRUCTURE

(71) Applicant: KING.COM LIMITED, St. Julians (MT)

(72) Inventors: Alberto Denia Navarro, Barcelona (ES); David Mari Larrosa, Barcelona (ES); Alice Lavedrine, Barcelona (ES)

(73) Assignee: KING.COM LTD., St. Julians (MT)

( * ) Notice: Subject to any disclaimer, the term of this patent is extended or adjusted under 35 U.S.C. 154(b) by 507 days.

(21) Appl. No.: 14/300,677

(22) Filed: Jun. 10, 2014

(65) Prior Publication Data

US 2015/0343312 A1  Dec. 3, 2015

Related U.S. Application Data

(63) Continuation-in-part of application No. 14/294,558, filed on Jun. 3, 2014, now abandoned.

(51) Int. Cl.
*A63F 9/24* (2006.01)
*A63F 13/00* (2014.01)
(Continued)

(52) U.S. Cl.
CPC ...... *A63F 13/5372* (2014.09); *A63F 13/5375* (2014.09); *A63F 13/60* (2014.09);
(Continued)

(58) Field of Classification Search
USPC ........ 463/6, 20, 31, 35, 42, 43, 16; 370/351, 370/352
See application file for complete search history.

(56) References Cited

U.S. PATENT DOCUMENTS 8,831,205 B1 * 9/2014 Wu ..................... H04M 3/5233
370/352
2009/0172534 A1 7/2009 Budreau et al.
(Continued)

OTHER PUBLICATIONS

International Search Report, dated Oct. 26, 2015, and Written Opinion, issued in corresponding International Application No. PCT/EP2015/062367.
(Continued)

*Primary Examiner* — Adetokunbo O Torimiro
(74) *Attorney, Agent, or Firm* — Saul Ewing Arnstein & Lehr LLP

(57) ABSTRACT

A computer-implemented method of using a scene data structure to display a game tutorial on a display, including accessing a scene data structure, the scene data structure having a plurality of display data elements, each associated with a respective data element identifier, the display data elements containing display data for displaying game elements on the display in a game scene; accessing tutorial data, the tutorial data comprising a tutorial data element identifier; searching the scene data structure for a data element associated with the tutorial data element identifier, that data element containing display data for displaying a respective game element; generating highlighting data using the results of the searching step, the highlighting data for highlighting the respective game element on the display; and displaying the respective game element as a highlighted game element on the display in a tutorial scene using the generated highlighting data. Devices and systems are disclosed.

14 Claims, 23 Drawing Sheets

(51) Int. Cl.
  *G06F 17/00* (2006.01)
  *G06F 19/00* (2011.01)
  *A63F 13/5372* (2014.01)
  *A63F 13/63* (2014.01)
  *A63F 13/60* (2014.01)
  *A63F 13/5375* (2014.01)
  *A63F 13/77* (2014.01)
  *A63F 13/80* (2014.01)

(52) U.S. Cl.
  CPC .............. *A63F 13/63* (2014.09); *A63F 13/77* (2014.09); *A63F 13/80* (2014.09)

(56) References Cited

U.S. PATENT DOCUMENTS

| | | | | |
|---|---|---|---|---|
| 2011/0086686 | A1* | 4/2011 | Avent | A63F 13/10 463/6 |
| 2011/0306395 | A1* | 12/2011 | Ivory | 3/67 |
| 2012/0276992 | A1* | 11/2012 | Moinuddin | 3/86 |
| 2013/0129316 | A1* | 5/2013 | Dontcheva | H04N 5/76 386/241 |
| 2013/0303288 | A1* | 11/2013 | McCoy | G07F 17/3227 463/42 |
| 2014/0135104 | A1 | 5/2014 | Knutsson | |

OTHER PUBLICATIONS

Invitation to Pay Additional Fees, dated Aug. 19, 2015, and Annex to Form PCT/ISA/206, Communication Relating to the Results of the Partial International Search, issued in International Application No. PCT/EP2015/062367.

Julian33: "browser based games—Do I create a first login tutorial for new users?" Game Development Stack Exchange, retrieved from the Internet: URL: http://gamedev.stackexchange.com/questions/28175/do-i-create-a-first-login-tutorial-for-new-users [retrieved on Aug. 11, 2015] (Apr. 28, 2012) XP 055207260.

Michael N: "html—z-index highlights image on click," Stack Overflow, retrieved from the Internet: URL: http://stackoverflow.com/questions/13946187/z-index-highlights-image-on-click [retrieved on Aug. 11, 2015] (Dec. 19, 2012) XP055207332.

Jcoc611: "css—A depth (z-index) nightmare," Stack Overflow, retrieved from the Internet: URL: http://stackoverflow.com/questions/4963759/a-depth-z-index-nightmare [retrieved on Aug. 12, 2015] (Feb. 10, 2011) XP055207438.

* cited by examiner

USING A DATA STRUCTURE

CROSS-REFERENCE TO RELATED APPLICATIONS

This is a continuation-in-part of U.S. application Ser. No. 14/294,558, filed Jun. 3, 2014, the entire contents of which is fully incorporated herein by reference.

TECHNICAL FIELD OF THE INVENTION

The present invention relates to the use of a data structure to control elements that are outputted to a user at a computer device.

BACKGROUND OF THE INVENTION

In the field of computer-implemented games, game tutorials are an important tool to teach users the different features of a game application (or "app") or other executable game code. Currently tutorials must be hardcoded (that is, specifically programmed) for each level or feature. As a result, each tutorial involves writing a lot of specific and non-reusable tutorial code. Also, many ad hoc changes are usually required in the actual game code to accommodate the different tutorials.

For games that are presented in a "saga" format, a user moves between different levels of game, after completing each earlier level. Each level normally requires its own tutorial. It is sometimes the case that levels are altered in which case the tutorial for the level may also need to be altered.

All of that results in programmers having to dedicate a large amount of time to implement and change tutorials (even though this is intrinsically a design task), more bugs and less maintainable code. For instance, when it becomes apparent that a point in the game is difficult for players, it may be desirable to provide a new tutorial to aid them at that difficult point—currently, that new tutorial must be developed by programmers, compiled and distributed with a new version of the game application.

SUMMARY OF THE INVENTION

The present invention facilitates the creation of a generic tutorial system where programmers are only responsible for maintaining the core system instead of each individual tutorial, whilst freeing designers in order to easily create as many tutorials as they want (that can be readily built on top of the core system).

According to a first aspect, there is disclosed a computer-implemented method of using a scene data structure to display a game tutorial on a display, the method comprising: accessing a scene data structure, the scene data structure having a plurality of display data elements, each display data element associated with a respective data element identifier, the display data elements containing display data for displaying game elements on the display in a game scene; accessing tutorial data, the tutorial data comprising a tutorial data element identifier; searching the scene data structure for a data element associated with the tutorial data element identifier, that data element containing display data for displaying a respective game element; generating highlighting data using the results of the searching step, the highlighting data for highlighting the respective game element on the display; and displaying the respective game element as a highlighted game element on the display in a tutorial scene using the generated highlighting data.

In embodiments, the tutorial data may define a required user action that must be performed in order to progress from the tutorial scene to a new displayed scene.

The necessary action may be the user engaging with the highlighted game element via an input device. The input device may be a touchscreen of the display, and the necessary action may be the user tapping the highlighted game element.

The necessary action may be the user engaging with the tutorial scene via an input device. The input device may be a touchscreen and the necessary action may be the user tapping anywhere in the tutorial scene.

The scene data structure may be a scene graph having nodes that represent game elements and edges between parent and children nodes that represent behavioural dependencies of child nodes on parent nodes.

The generated highlighting data may be used to modify the scene graph, and the tutorial scene may be generated using the modified scene graph. The step of searching may comprise locating a node associated with the tutorial data element identifier, and the scene graph may be modified by inserting a new node in between the located node and its parent node.

The display data may comprise location data defining locations of game elements in the game scene, and the highlighting data may comprise overlay display data, which may be used to display an overlay on the game scene to create the tutorial scene, and location modification data, which may be used to modify z-coordinate location data of the identified game element to cause the identified game element to be displayed in front of the overlay, thereby displaying the identified game element as a highlighted game element in the tutorial scene.

According to a second aspect, there is disclosed a computer device comprising: a display; computer storage holding (i) a scene data structure, the scene data structure having a plurality of display data elements, each display data element associated with a respective data element identifier, the display data elements containing display data for displaying game elements on the display in a game scene, and (ii) tutorial data, the tutorial data comprising a tutorial data element identifier; one or more processors configured to search the scene data structure for a data element associated with the tutorial data element identifier, that data element containing display data for displaying a respective game element, to generate highlighting data using the results of the searching step, the highlighting data for highlighting the respective game element on the display, and to display the respective game element as a highlighted game element on the display in a tutorial scene using the generated highlighting data.

According to a third aspect there is disclosed a user device having a user interface and comprising: computer storage for holding tutorial data for use in outputting a game tutorial to a user of the user device, the game tutorial for teaching the user features of a game; a network interface configured to access a remote server via a computer network; an update component configured to access a current version identifier held in the computer storage, the current version identifier associated with a current version of the tutorial data currently held in the computer storage, to effect a comparison of the current version identifier with a version identifier associated with a version of the tutorial data held at the server, to receive, when said compassion indicates that the version held at the server is newer than the current version held at the user device, the newer version of the tutorial data from the server, and to store in the computer storage the newer version when received and its associated version identifier; and a game tutorial component configured to control the user interface to output the game tutorial to the user using the most recent version of the tutorial data held in the computer storage.

In embodiments, if the current version of the tutorial data is an initial version of the tutorial data held in a game application bundle in a first location in the computer storage, the new version of the tutorial data may be stored when received in a documents folder in a second location in the computer storage without modifying the initial version; but if the current version of the tutorial data is a previously-received version of the tutorial data held in the documents folder in the computer storage, that-previously received version of the tutorial data may be overwritten by the new version when received.

The game tutorial component may be configured to first access the game documents folder in the computer storage and to only access game application bundle to access the initial version of the tutorial data for outputting the tutorial if no to version of the tutorial data is present in the game documents folder.

According to a fourth aspect, there is disclosed a method of updating tutorial data held locally at a user device having a user interface, the tutorial data for use in outputting a game tutorial to a user of the user device, the game tutorial for teaching the user features of a game, wherein the user device is configured to control the user interface to output the game tutorial to the user using the most recent version of the tutorial data held at the user device, the method comprising: accessing a current version identifier held at the user device, the current version identifier associated with a current version of the tutorial data currently held at the user device; effecting a comparison of the current version identifier with a version identifier of a version of the tutorial data held at a server; when said compassion indicates that the version held at the server is newer than the current version held at the user device, receiving the newer version of the tutorial data from the server; and storing at the user device the newer version when received and its associated version identifier.

According to a fifth aspect there is disclosed a computer program product comprising executable code stored on a computer readable storage medium and configured when executed to implement any of the methods or systems disclosed herein.

BRIEF DESCRIPTION OF FIGURES

To aid understanding of the present invention, reference will be made by way of example only to the following drawings in which:

FIGS. 9-19 illustrate various game scenes displayed whilst a player is playing a pyramid solitaire game:

FIG. 9—Example of a Pyramid Solitaire level.

FIG. 10—Pre-level screen of a level with a target score.

FIG. 11—Pre-level screen of a level with a target streak.

FIG. 12—Pre-level screen of a level where the player needs to have a certain amount of cards left in the deck.

FIG. 13—Pre-level screen of a level where the player needs to finish the level within a certain time frame.

FIG. 14—Showing face-down cards.

FIG. 15—A Bomb card counting down.

FIG. 16—One implementation of Mummy Cards.

FIG. 17—One implementation of colour locks.

FIG. 18—One implementation of Jungle cards.

FIG. 19—Describing how to obtain jewels.

DETAILED DESCRIPTION OF THE INVENTION

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. In particular, a "match 3 switches" game-based implementation will be used to provide context for the purposes of illustration. It is to be understood that other implementations may be utilized, and structural and functional modifications may be made without departing from the scope of the present invention.

Figure 1A:
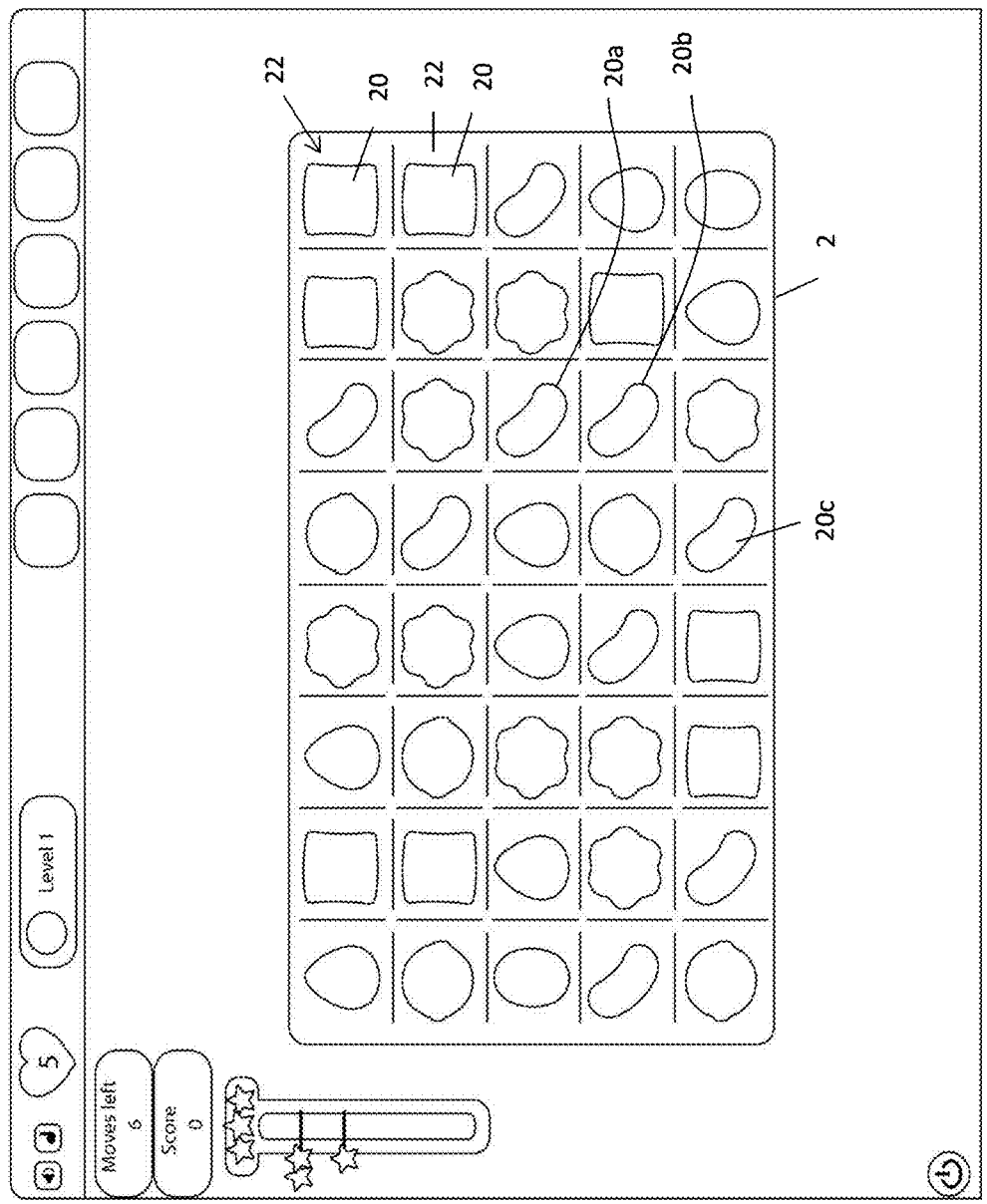
FIG. 1A is a schematic diagram of a game board of an existing version of a match three game.

FIG. 1A shows a display of a known version of a match 3 switches game called Candy Crush Saga™, implemented by a suitable game app. FIG. 1A illustrates a game board 2 with a plurality of active game elements 20 when the game app is operating in a play mode (that is, in a mode in which the player can actively play the game).

The game elements are each of six different shapes and colours. Each game element is supported by a tile 22. The tiles are not readily visible to a player of the game—the game elements are the main focus for a player. However, the tiles govern characteristics of the game elements which are visible to a player as will be described in more detail later. The board and tiles are examples of passive game elements, as the user does not engage with these directly when playing the game in the play mode.

Figure 1B:
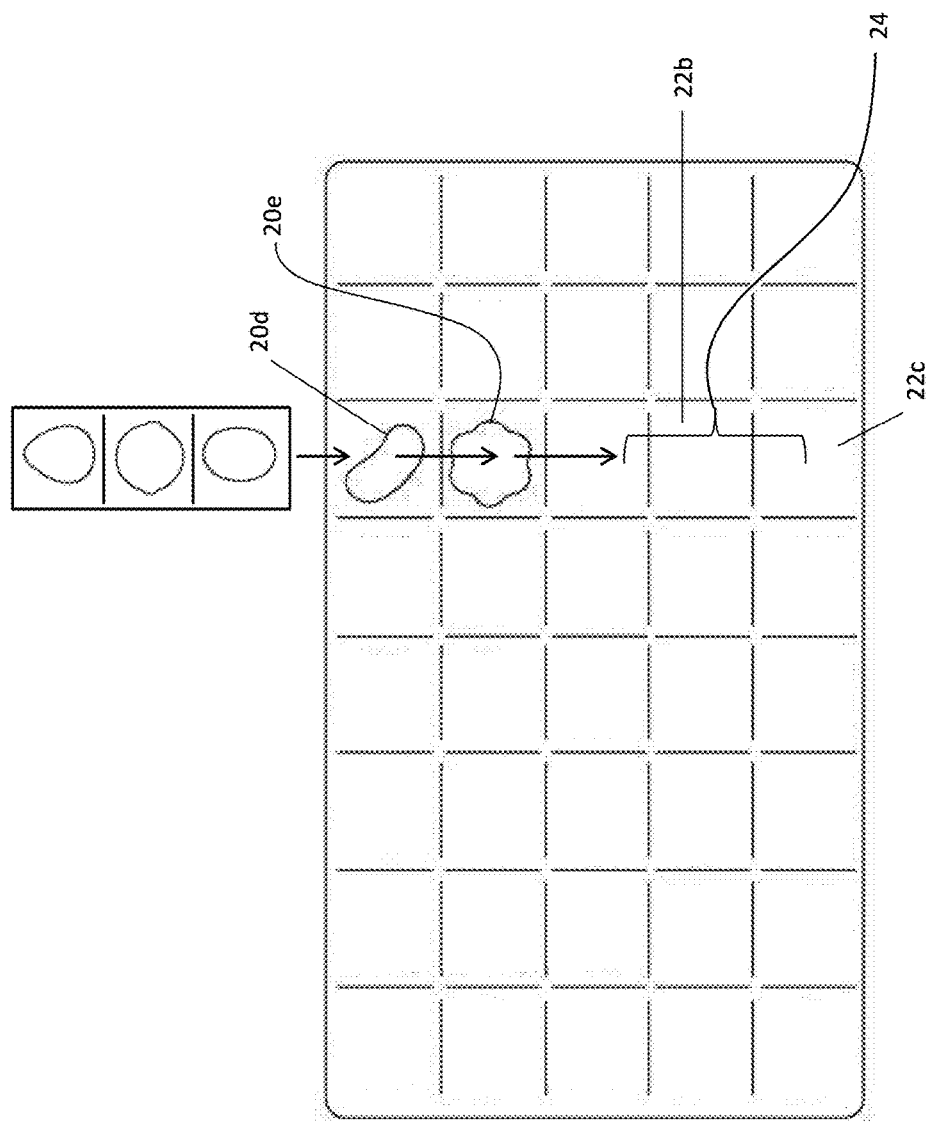
FIG. 1B is a schematic diagram illustrating how a game board is repopulated with replacement game elements.
Figure 10:
FIG. 10 is a flow chart indicating the operation of the replacement of FIG. 1B.

The aim of the game is to swop game elements in the shape of candies with each other to make moves on the game board. To gain points the player has to make moves that create matches of at least three of the same candy. In doing so, the player gains points and the matched candies are removed. As a result new candies fall into place from the top of the game board in order to fill any spaces created. Assume in FIG. 1A that game element 20c is moved one place to the right to form a three-line match with game elements 20a and 20b. Turning now to FIG. 1B, this has the effect of game board elements 20a, 20b and 20c "disappearing", creating a visual effect (animation) on the screen to indicate the disappearance, such as a minimal explosion effect denoted 24 in FIG. 1B. The two game elements which were directly above game elements 20a will now fall downwards into the spaces created by the removal of game elements 20a, 20b and 20c. Thus, game element 20e will end up at the location of tile 22c, and game element 20d will end up at the location of tile 22b. In addition, three new tiles with game elements are "created" and fall downwards into the game board to fill the remaining three spaces above tile 22b. The game elements on the newly created tiles which fall downwards into the game board are generated at random. The user then has a new game board on which to play a subsequent move. FIG. 10 is a flow chart illustrating a process implemented by software in a processor for executing the basic game mechanic just discussed. At step S1 the input made by a player on the screen is analysed. At step S2 the game rules are applied to see whether or not at least a three-element match has been created. If it has not, at step S3, the screen indicates an illegal move to a user, and the player must try again. If a match has been detected, at step S4 an appropriate visual effect is generated for the display to denote the match and the disappearance of the game elements which have been matched. At step S5, new game elements are generated for the display, these game elements falling downwards to fill up the display from the top.

An arrangement of game elements at a particular point during play mode operation constitute a "game play scene" as used herein, with the game scenes changing as the user progresses through the game in accordance with the game rules.

The game elements, tiles and game board are outputted by controlling a user interface (UI) of a suitable user device available to the player.

Figure 1C:
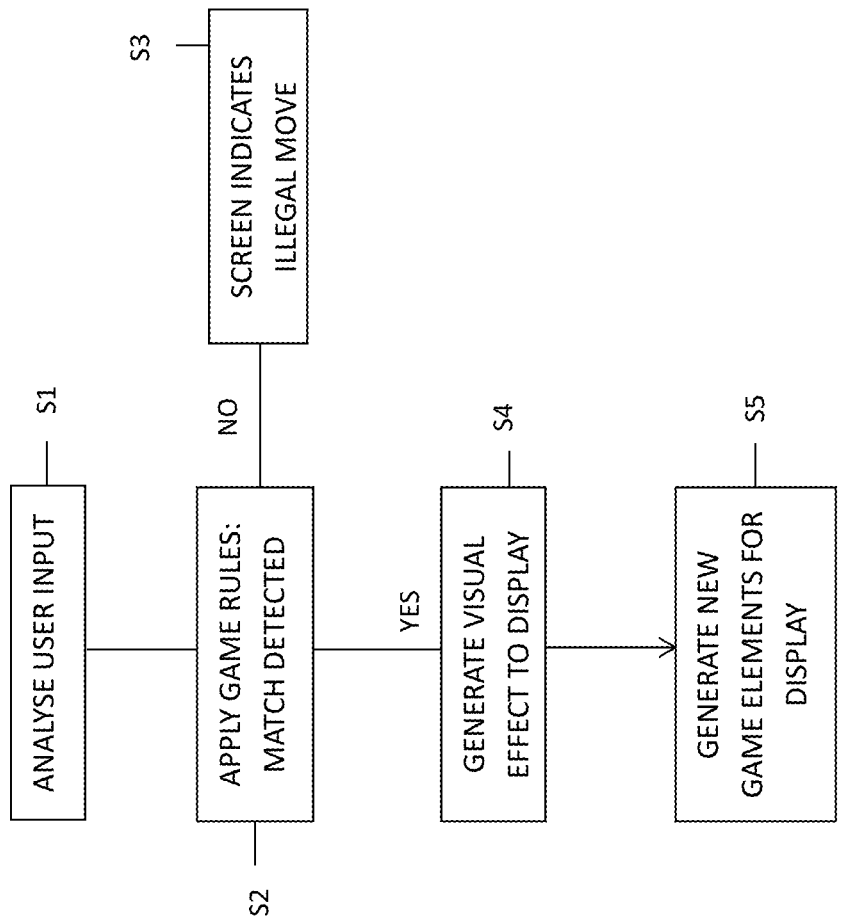
FIG. 1D shows a flowchart for a method of outputting a game tutorial and a graphical illustration of the method steps.
Figure 1D:
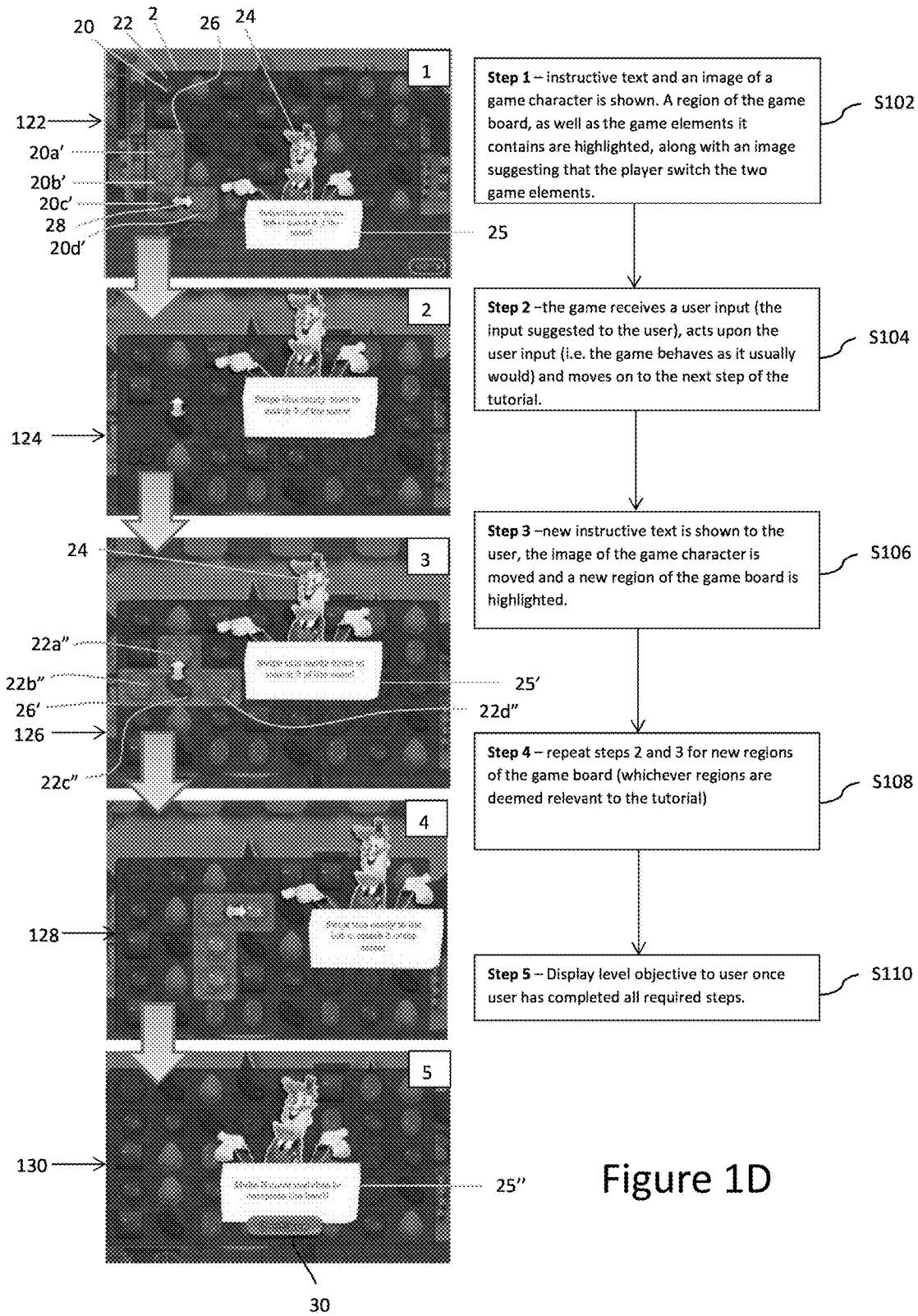

FIG. 1D is a flowchart that provides a high-level overview of a process of outputting a game tutorial of the game of FIGS. 1A-1C to a user, as performed by the game application when operating in a tutorial mode. The method involves controlling the user interface at various stages S102-S110 to display various tutorial scenes 122-130. The purpose of the game tutorial is to teach the user various features of the game e.g. to teach the user the game rules so that they can play the game without doubt or confusion. The tutorial scenes may, at various stages, also comprise an arrangement of game elements 20, with which the player can interact although, as explained in more detail below, the manner in which the player can interact with game elements in the tutorial mode is more restricted than the play mode (as the purpose of these tutorial mode interaction is the learning of the game, rather than the playing of the game for points (or similar) per se).

To provide an engaging user experience and to facilitate proper learning of the game rules, the tutorial requires the user to illustrate that they have understood an explained game rule at certain stages by properly applying that game rule to selectively highlighted game elements that are displayed in outputting the tutorial (those being elements to which that rule is applicable). As an example, a tutorial may only proceed to a new tutorial scene from a current tutorial scene that explains a particular rule or rules when the user successfully demonstrates their understanding of that or those rules rule or rules by engaging with the highlighted game elements in the correct manner, for instance by successfully forming a three-line match by swapping highlighted game elements specifically. Other game elements may also be displayed to provide context, but in contrast to the highlighted game elements, these are not actuatable by the user when the app is operating in the tutorial mode.

Tutorials are composed of sequential steps, which comprise: displaying an image, showing text, and highlighting a game board and/or specific game elements.

At step S102, a first tutorial scene 122 is displayed which shows the game board 2 with game elements 20 in game tiles 22. Selective game elements 22' occupying a region 26 of the game board 2 are shown as highlighted game elements. In this example, the game elements 22' are highlighted by displaying a partially opaque overlay over the remaining non-highlighted game elements, thereby partially obscuring the non-highlighted game elements by reducing their visibility relative to the highlighted game elements 22'. This has the effect of making more prominent the highlighted game elements 22' as well as the region 26 that they occupy. Instructive text 25 and an image of a game character 24 is shown, the character pointing to a particular highlighted game element 20'd. An image 28 of a bidirectional arrow is displayed between highlighted game elements 20'c and 20'd is displayed to indicate that these game elements can be swapped to form a three-element match, which is also explained explicitly by the instructive text 25 which recites that the user should swipe the game element 22'd to the left (where game element 22'c is currently located) to form the three-element match (with highlighted elements 22'a and 22'b).

In this example, to avoid distraction to the player, the player can engage with (that is, interact with) the highlighted game elements 20' (in performing required tutorial steps) but not with the remaining non-highlighted game elements. For instance, the game application may ignore any user engagement with the non-highlighted game elements; that is, ignore any user input(s) at the UI that do not satisfy one or more tutorial mode engagement criteria associated with the current tutorial scene.

As step S104, the game receives a user input that does satisfy an engagement criterion. Specifically, the game detects that the player has interacted with the highlighted element 20'd by swiping it to the left as instructed to form the three-way match. In response, the game acts substantially as it would had the match been formed during actual play in the play mode (as described above), proceeding a second tutorial scene 124 in which the matching elements have disappeared and thereafter to a third tutorial scene 126 in which they have been replaced accordingly.

At step S106, new instructive text 25' is displayed and a new region 26' of the game board 2 is (that is, new elements 22") are highlighted. The character 24 is moved so as to point to a new highlighted element 22"a that should be swiped down to form a three-way match, with the new text 25' explaining this explicitly. Steps S106 and S108 are repeated for all new regions of the game board that are relevant to the tutorial (S108) until the user has completed all of the required tutorial steps (S110). Once completed, a game objective 25" for the game is displayed along with a selectable play option 30, responsive to which the game app switched to the game play mode in which the player can actually play the game as described with reference to FIGS. 1A-C above.

As indicated above, to implement each game tutorial of the kind described with reference to FIG. 1D, using known techniques, a programmer would have to write specific, non-reusable game tutorial code into the game application for that specific purpose. Moreover, to add such a tutorial to an existing game app, the programmer would also likely have to modify the existing game code itself in an ad hoc fashion to be able to incorporate that specific tutorial code into the game application. In contrast, in accordance with the following described techniques, the details of the tutorial are defined in tutorial data, separate from the game app itself and held at a different location in computer storage of the user device on which the game app is executed, and which is then used by a generic tutorial system implemented by the app to deliver the tutorial (which can be reused for different and/or new tutorials without modifying the generic system). Thus, a tutorial such as that described above can be implemented in a more straightforward, robust and flexible manner in accordance with the teachings of the present disclosure.

Figure 9:
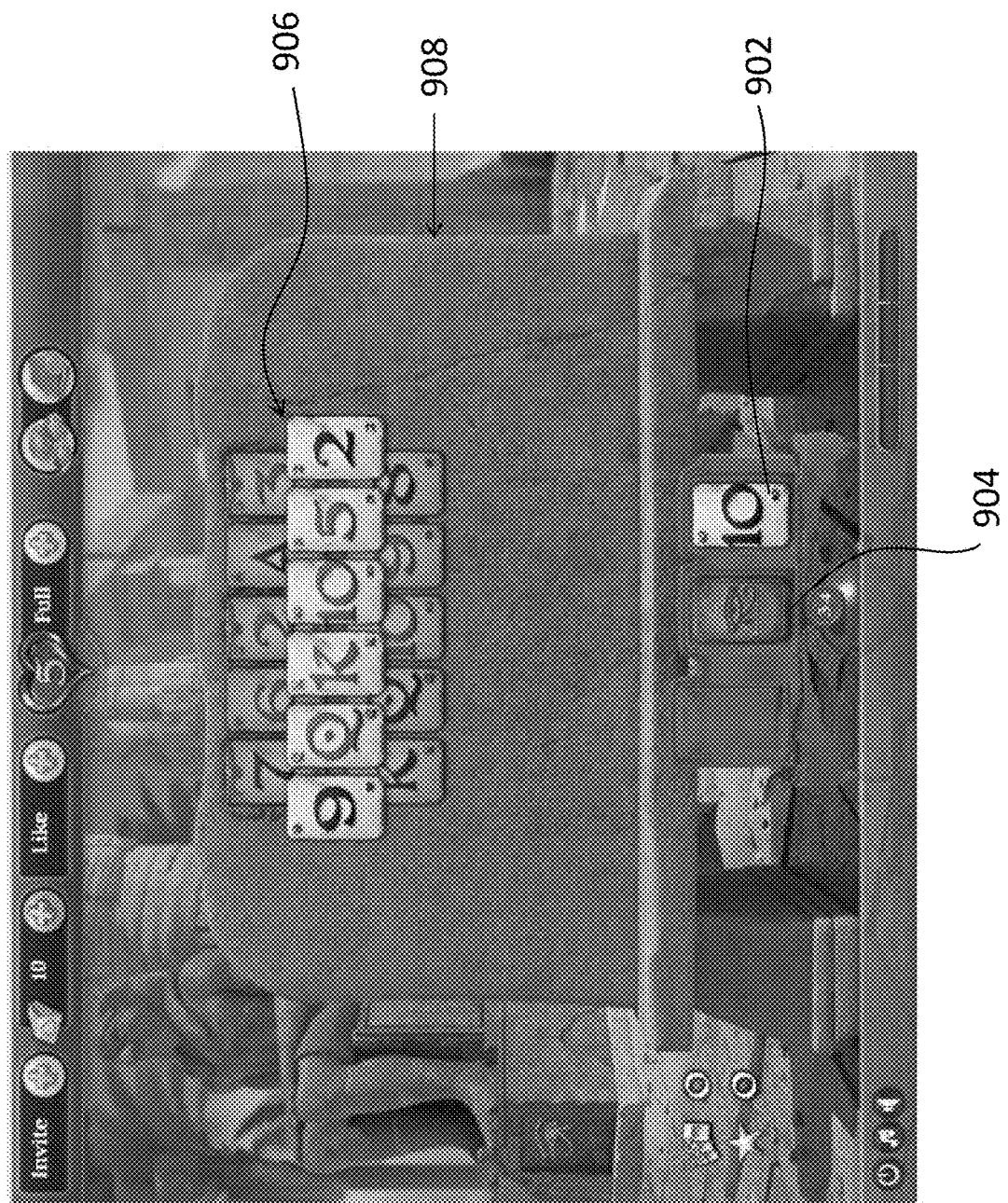

Another example of a game for which tutorials can be provided is Pyramid Solitaire Saga. Pyramid Solitaire Saga is a virtual card game that resembles a classic form of Solitaire called Pyramid, but with different rules and card layouts that differ from the pyramid-shape. Other aspects have also been added and adjusted from the classical game to enhance the gameplay and utilize the social network connections and the computer. A typical implementation can be seen in FIG. 9 which illustrates displayed game elements including an active card game element 902, a deck pile 904 and various other card game elements 906 (on a card table 908) at different card positions "(x, y, z)" with which the user must engage to complete the game objectives.

Instructions:

Clear as many pyramids as possible by removing the cards one by one before you run through your deck of cards or out of time.

To clear away cards from the pyramid they have to be one value higher or lower than the open (active) card 902 of the pile. So on a 4 you can place either a 3 or a 5, and so on. The player can click on the face-down portion of the pile to flip over a new card from a deck pile 904.

You move cards from the pyramid by clicking on them with your left mouse button. If a card is free to move it will get highlighted when you move your mouse over it.

Additional Rules

In addition to the basic rules, there are some other ones that further add to the complexity of the game:

Cards with a gold edge are hiding scarabs underneath them. The goal of the game is to remove these gold cards from the playing field.

Cards can only be removed from the board if they are not covered by other cards.

In some levels, the player has a joker-card that can be used as any other card, meaning that any card can be removed from the playing field and put on top of the joker card.

At the end of the level, players get bonus points for the maximum number of moves in a row without using the deck as well as for the cards remaining in the deck and the cards remaining on the playing field.

When removing gold-edged cards, scarabs emerge. Some of them start moving around after being released, and can be clicked on by the player in order to receive a reward. In some implementations, the regular cards cannot be clicked during the time a scarab moves around, in order to prevent the player from making unintended moves when trying to click a scarab.

Game Modes

The game has several different game modes. Different levels may have different game modes, and in some implementations it is possible to play random levels of a selected game mode. All game modes can be unlocked from the start or they can require certain criteria to be fulfilled before they are unlocked. In a typical implementations more game modes are unlocked as the player progresses through the game.

Achieve a Certain Target Score

In this mode, the player is supposed to get a certain amount of points with a limited amount of cards in the deck. Points can be gained by:

Removing cards

Removing multiple cards in a row

Having cards left in the deck when finishing

Having cards left on the board while finishing

In FIG. 10 a typical pre-level screen is shown.

Achieve a Certain Streak

Figure 11:

In this mode, the player is supposed to remove a certain amount of cards in a row, without using the deck in between. The joker card can be used without breaking a combo. After the combo has been achieved, the player still has to remove the remaining cards from the playing field before the level is finished. In some implementations, the player also has to achieve a certain minimum score in this mode. An exemplary implementation can be seen in FIG. 11.

Finish with a Certain Amount of Cards Left in the Deck

Figure 12:

In this mode, the player is supposed to finish the game by removing all cards from the playing field, and still have unused cards left in the deck. In some implementations, the player also has to achieve a certain minimum score in this mode. An exemplary implementation can be seen in FIG. 12.

Finish the Level within a Certain Time-Frame

Figure 13:

In this mode, the player has to finish the level within a certain time frame. In some implementations, the player also has to achieve a certain minimum score in this mode. An exemplary implementation can be seen in FIG. 13.

Speed and Eternal Game Modes

Both of these game modes have the same principle—an continuous layup of cards, meaning that there is no 'last card' to be removed. The goal can be to achieve as high a score as possible, or in some implementations to get a high combination or to remove as many rows or lines as possible.

The Speed mode has a time limit to it. This time limit can in some implementations be subject to change depending on actions performed by the player. For instance, the player can get an extra five seconds for removing five cards in a row, enabling the possibility to keep playing for longer than the initial time limit.

The Eternal mode is a continuous layup without a time limit. The only thing that can stop the player from continuing in this mode is a blocker of some kind.

Other Task-Based Levels

There can be variations on the tasks required to finish a level, other than the examples mentioned previously. These variations include but are not limited to:

Clear 10 cards in a sequence without using a joker in the sequence

Clear 2 sequences of 5 or more

Clear 2 scarabs in 1 sequence

Clear layup with 5 cards left on table
Clear layup without using a joker

Blockers and Obstacles

Face Down Cards

Figure 14:
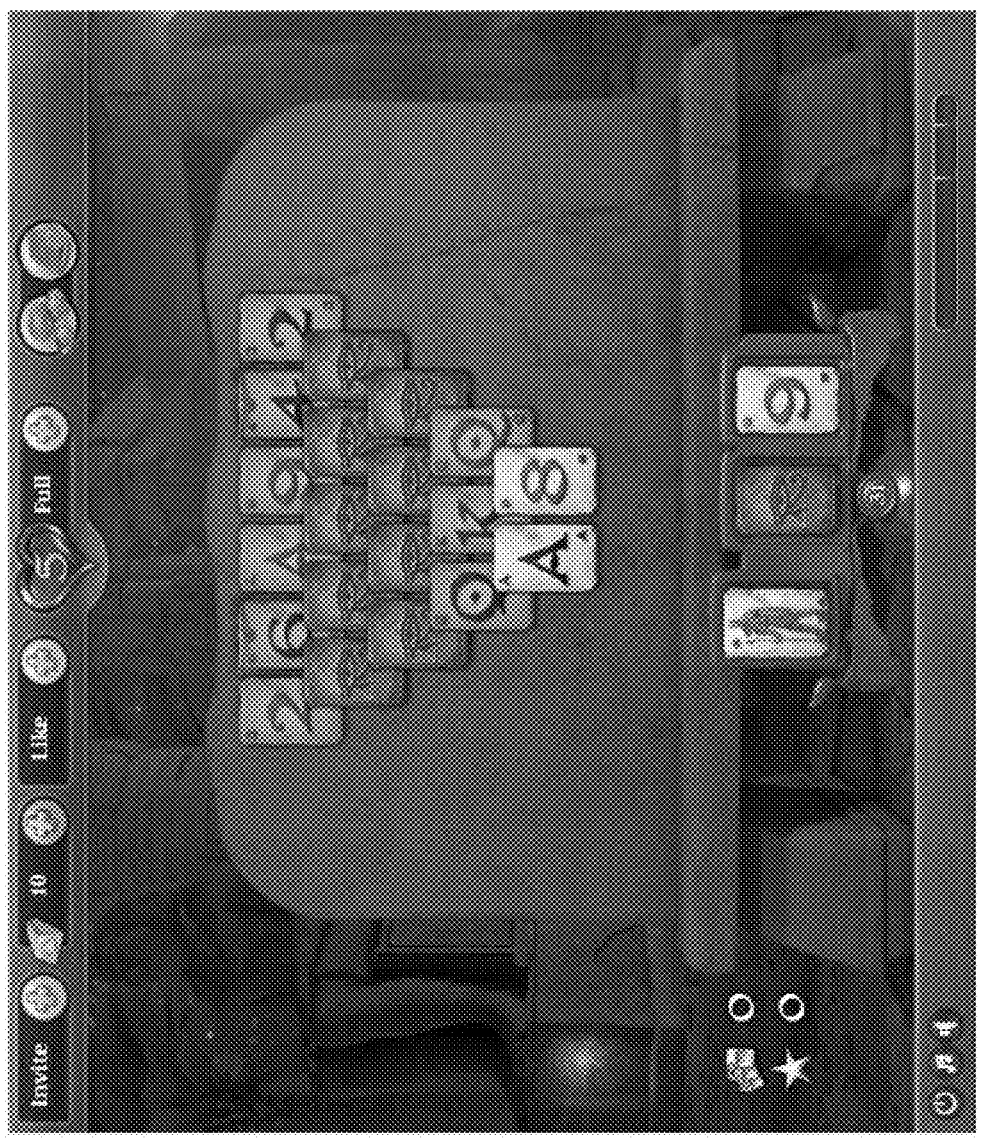

Cards can be turned face down, meaning that the player does not see which card it is. Cards can be turned faced down as long as they are covered by other cards, but when there are no more cards covering them they are turned face up. The figure below show face down cards, the four ones in the third row will in a typical implementation be turned face up after the two queens and the king that cover them are removed. An exemplary implementation can be seen in FIG. 14.

Locked Cards with Key

Cards can have a lock on them, meaning that they cannot be picked until the lock has been removed. Locks are removed by finding a corresponding key, the key is typically located on a certain card in the layup.

Locked Cards Requiring Removal of a Certain Card

Cards can also have locks that do not require the use of keys, but instead require the player to remove one or several of a specific card type. For example, a card with an 'Ace-lock' on it will not be pickable until at least one ace has been removed from the layup.

Bomb Cards

Figure 15:
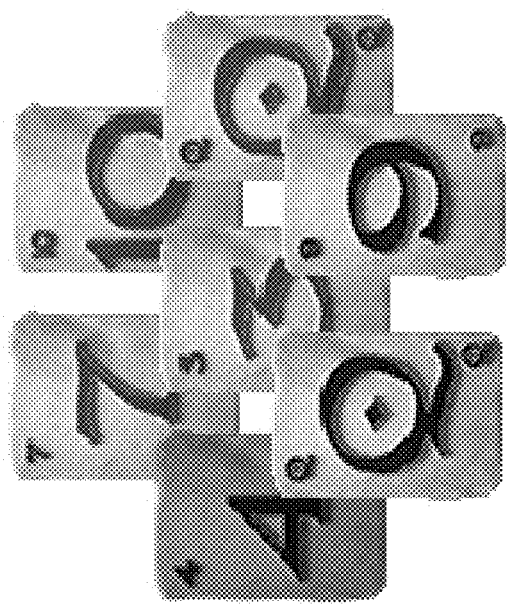

Bomb cards are distinguished by a timer next to them. This time will count down from a number (e.g. ten) to zero, and if it has not been removed before it reaches zero the player loses the game. In some implementations the countdown is dependent on the number of moves the player makes, in other implementations the countdown can be based on time. The figure below shows a Bomb card, indicated by being red in colour, with a countdown showing when it is about to cause the player to lose the level. These cards can both be designed to have a certain placement in a level, or they can be placed randomly. An exemplary implementation of a bomb card can be seen in FIG. 15 where the 4 in the picture is the Bomb card.

Scarabs Turning Cards Face Down

As mentioned, scarabs that are released when gold cards are removed can sometimes move around in random patterns, and the player can click on them to gain bonuses. In some implementations certain scarabs can have negative effects, such as turning cards face down when they pass over them.

Chain Cards

Chain cards only removable as a latter part of an extended sequence. These cards are not clickable until the player has made a long enough sequence, and can only be removed as a part of that sequence. This means that if the player breaks a sequence, a card that was removable can become un-removable again, until the player once again achieves the required number of removed cards in a row.

Timed Cards

Timed cards are slightly different from bomb cards. They have the same characteristics in that the player loses the game when they count down to zero, but it is up to the player to decide when to trigger them. Timed cards have a number that shows what the countdown will start from.

When removing a timed card, a count down begins and the level has to be completed before the countdown reaches zero. In some implementations the countdown is dependent on the number of moves a player makes, in other implementations it is dependent on time. This means that the player has to decide when to remove a timed card, which should preferably be done when the player feels like the level can be completed within the amount of time or moves indicated by the timed card.

Mummy Cards

Figure 16:
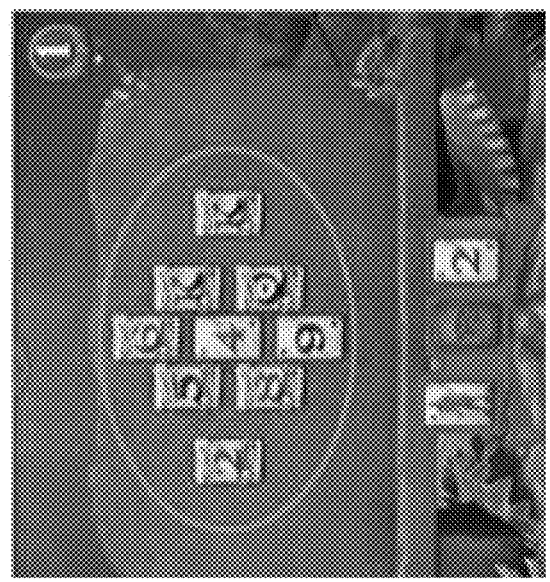

These cards are covered in bandage. After matching a Mummy card for the first time, the bandage is removed but the card is not. After removing the bandage, the card acts as a regular card. This means that the player has to pick each Mummy card twice before it gets removed. FIG. 16 illustrates several cards covered by bandage.

Colour Locks

Figure 17:
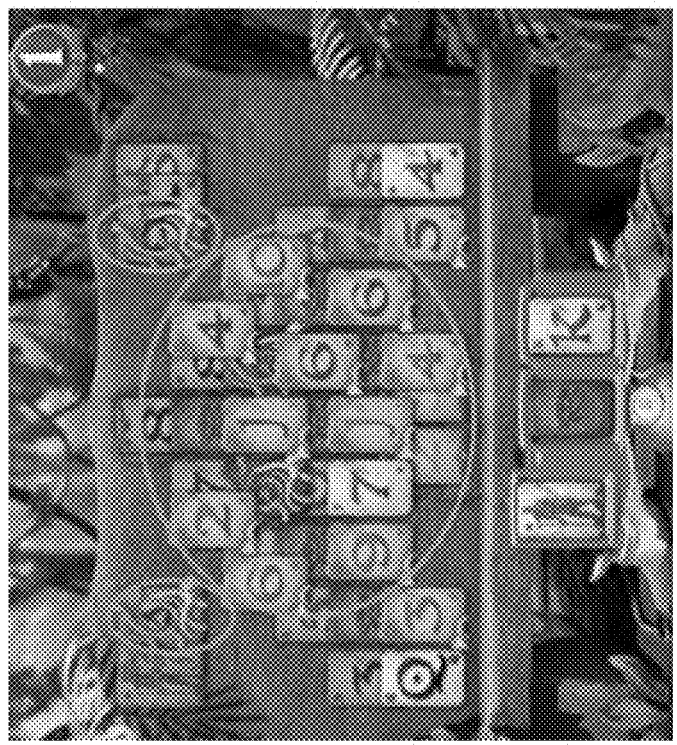

Colour locks make it so that cards are not pickable until the lock is removed. The player has to find a coloured key that corresponds to a lock in order to unlock it. The figure below illustrates a yellow key that can be found on the Jack, which needs to be used in order to unlock some of the locked cards in the middle. An exemplary implementation can be seen in FIG. 17.

Jungle Cards

Figure 18:
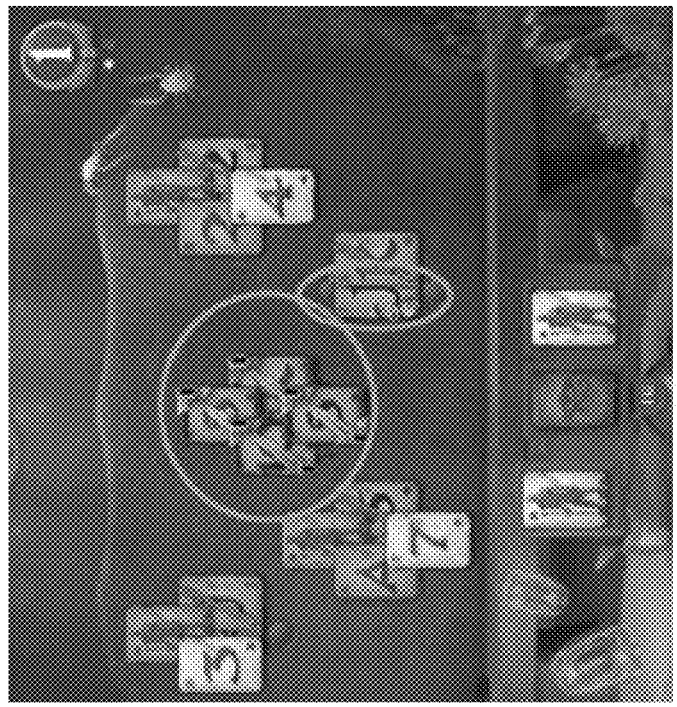

Jungle cards are a kind of blocker that is a combination between green coloured cards (multiple ones or a single one) and at least one tangled card. The tangled card cannot be picked until all of the green cards have been removed. The figure below illustrates a layup with multiple green cards and two tangled cards. An exemplary implementation can be seen in FIG. 18.

Leaf Cards

Cards can be covered by leaves. One layer of leaves removes for each card picked in a streak. If you turn up a new card, the streak is broken and the latest layer that was removed is pulled back.

Multiple Stage Levels

Multiple stage levels are not a blocker per se, but it is something that increases the difficulty of a level. Multiple stage levels are designed so that the player has to remove several layups in a row before completing the level. If the player fails with one of the stages, the whole level has to be restarted. For instance, a player completing a first layup in a double stage level, but fails on the second one, will be forced to restart the level and again attempt to remove both stages in a row without failing in between.

Boosters

Boosters are objects in the game that help the player overcome various obstacles. There are for example some boosters that counteract certain blockers, and others that help with general level constraints such as an additional joker card. Boosters can either be found or be given as a reward during the playing of the game, or they can be purchased. Typically there can be at least two different variants of the same booster, one that is usable only one time and another that is permanent and can be used once per level. This applies to all boosters described herein and will not be specified for each one. The mechanics of purchasing boosters is further described elsewhere.

Score Multiplier Card

In a typical implementation, score multiplier cards are signalled by being golden. Unlike the scarab cards, which have a golden edge, the entire of a score multiplier card is coloured. This is illustrated in the figure below. When clearing a score multiplier card, the player gets his scored multiplied by a factor for a certain amount of moves. In a typical implementation, the score multiplier is 2 and the 10 cards following the removal of the score multiplier card.

Extra Joker

This card gives the player an extra Joker card. In some implementations this has to be activated prior to starting a level, in other implementations the extra joker can be activated during the play of a level.

Extra Time

This booster gives the player extra time, and is therefore only applicable on levels that have a time constraint. In some implementations this has to be activated prior to starting a level, in other implementations the extra time can be activated during the play of a level.

5 Extra Cards in Deck

This booster lets the player start with 5 extra cards in the deck. In some implementations this booster can also be activated during the play of a level to add 5 cards to the deck.

Lock Breaker

This booster is used to unlock locked cards, and is therefore only usable in levels containing locked cards.

Bomb Defuser

This booster can be used to defuse a bomb card or a timed card. Upon use, the bomb and/or timed cards are removed, or in some implementations the countdown stops but the cards remain on the board until removed.

Scarab Freeze (Easy to Collect)

This booster makes it so that the scarabs in a level freeze, making it easier for a player to click them. It also helps in levels where scarabs can flip cards they pass by, since immovable scarabs do not move over any cards.

Card Holder

This booster gives the player the possibility to have a card holder in which cards can be stored. One card on the board can be placed into the holder without having to be removed, enabling longer streaks and making the levels easier to complete.

Anti-Jungle Booster

This booster can be used on levels containing Jungle cards. When used, it turns all green cards into normal cards. In some implementations, the green cards are removed instead of turned into normal cards when this booster is used.

Anti-Leaf Booster

This booster can be used on levels containing leaf cards. When used, it removes the leaves from all cards covered in leaves. In some implementations, the leaf cards are removed instead of turned into normal cards when this booster is used.

Anti-Mummy Booster

This booster can be used on levels containing mummy cards. When used, it removes the bandages from all cards covered in bandages. In some implementations, the cards with bandage are removed instead of turned into normal cards when this booster is used.

Jewels

Figure 19:
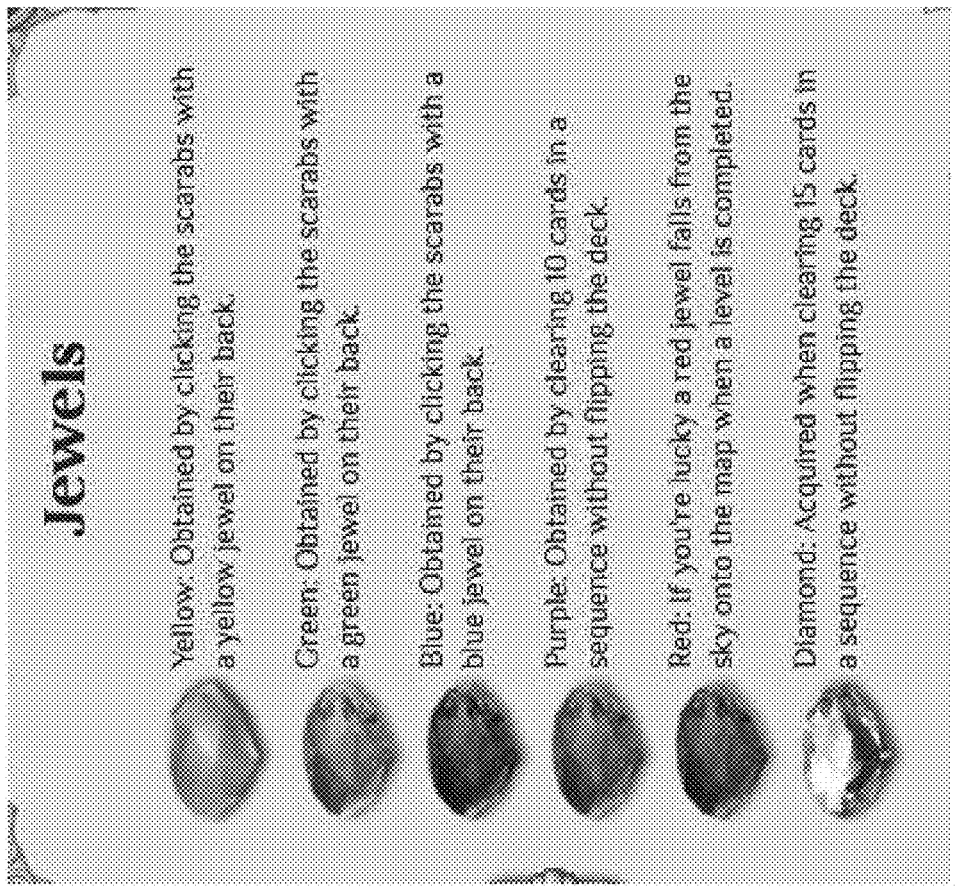

Jewels are valuable items that can be found throughout the game. They can be used to craft boosters, and in some implementations they can also be sold for in-game currency. The figure below shows the different types of jewels and one implementation of how they are obtained. An overview of available jewels in an exemplary implementation can be seen in FIG. 19.

Undo Move

This booster can be used to undo the last move the player performed. In some implementations, the player can undo more than one move in a row, and it can be possible to undo moves from several moves back.

Seasonal Bonus Levels

In some implementations, the game will have special levels that are seasonally dependent. One example of an implementation is one in the form of an Advent Calendar. In this example one level is released each day from December 1 to December 25. It can be possible for players to pay in order to receive early access to the levels, even though they still have to complete a level in order to play the next one.

This is not limited to being implemented during Christmas times, it can be applied to any season or holiday, including but not limited to Halloween, Easter and Summer.

The levels can for instance be accessible after a certain level in the game has been completed, or it can be accessible to all players from the start. In some implementations the player will have to fulfil certain criteria, such as inviting a minimum number of friends, in order to get access to the bonus levels. In other implementations, the player is needed to purchase the bonus levels in order to get access to them.

In a typical implementation, seasonal bonus levels will only be accessible for a pre-defined period of time, such as from the start of December until three weeks after Christmas. However, it can be possible for players to get access to levels after they have been taken down for the general public, for instance by inviting friends or making a purchase.

Crafting Boosters

It is possible for the player to craft boosters instead of buying or finding them. Jewels are used as a basis for crafting, and each booster has certain requirements in order to make it.

It may be desirable to provide a tutorial that describes any one or more of the above features of the Pyramid Solitaire Saga game, and in so doing to highlight certain game elements (e.g. 902, 904, 906) in a similar manner to the Candy Crush tutorials. In accordance with the teaching set out below, this can again be achieved using tutorial data separate from the solitaire game app itself which is processed by a generic tutorial system implemented by the app to deliver the tutorial.

It will be appreciated that the set of game rules outlined above for the Pyramid Solitaire game are for one exemplary version of the Pyramid Solitaire game. As will be apparent, in other versions, some of the game features mentioned above may be omitted and/or other features may be introduced. For instance, in another version exemplary version, jewels, crafting, time-limited/speed/eternal levels (and therefore extra time boosters) are not included.

Figure 4:
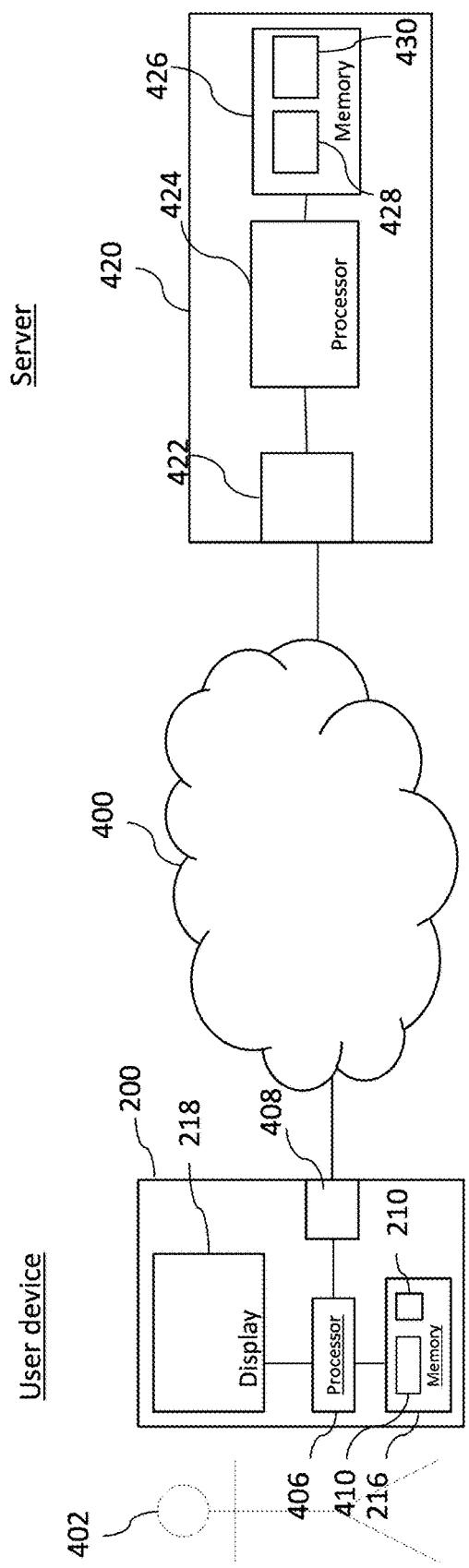
FIG. 4 is a schematic architecture diagram of a context in which a computer device can be utilised to deliver a game tutorial.

FIG. 4 is a schematic illustration of a computer system comprising a user device 200, available to a player (user) 402, and a server 420 connected to a computer network 400. The user device comprises a display 200, a memory 216 and a network interface 408 all of which are connected to one or more processors 406 (e.g. CPUs) of the user device 406. The memory holds game code 410 for execution on the processors 406 (e.g. CPUs/processor cores), such as a game app of the kind mentioned above, and one or more versions of tutorial data 210 (e.g. in the form of a one or more tutorial files), each associated with a respective version identifier held in memory 216 as explained in more details below. The network interface 408 enables the user device to communicate with the network 400.

The server 420 comprises a network interface 422 and a memory 426 connected to one or more processors 424 of the server 420. The memory 426 holds server code 428 for execution on the processors 424 and at least one version of the tutorial data 430 accessible to the user device 200 via the network 400. Although shown as a single server device, the functionality of the server 420 (described below) may be implemented by multiple server devices in a distributed fashion.

The memories 216, 426 are in the form of computer readable storage media for storing code and data (and may be e.g. electronic or magnetic memory).

Figure 2A:
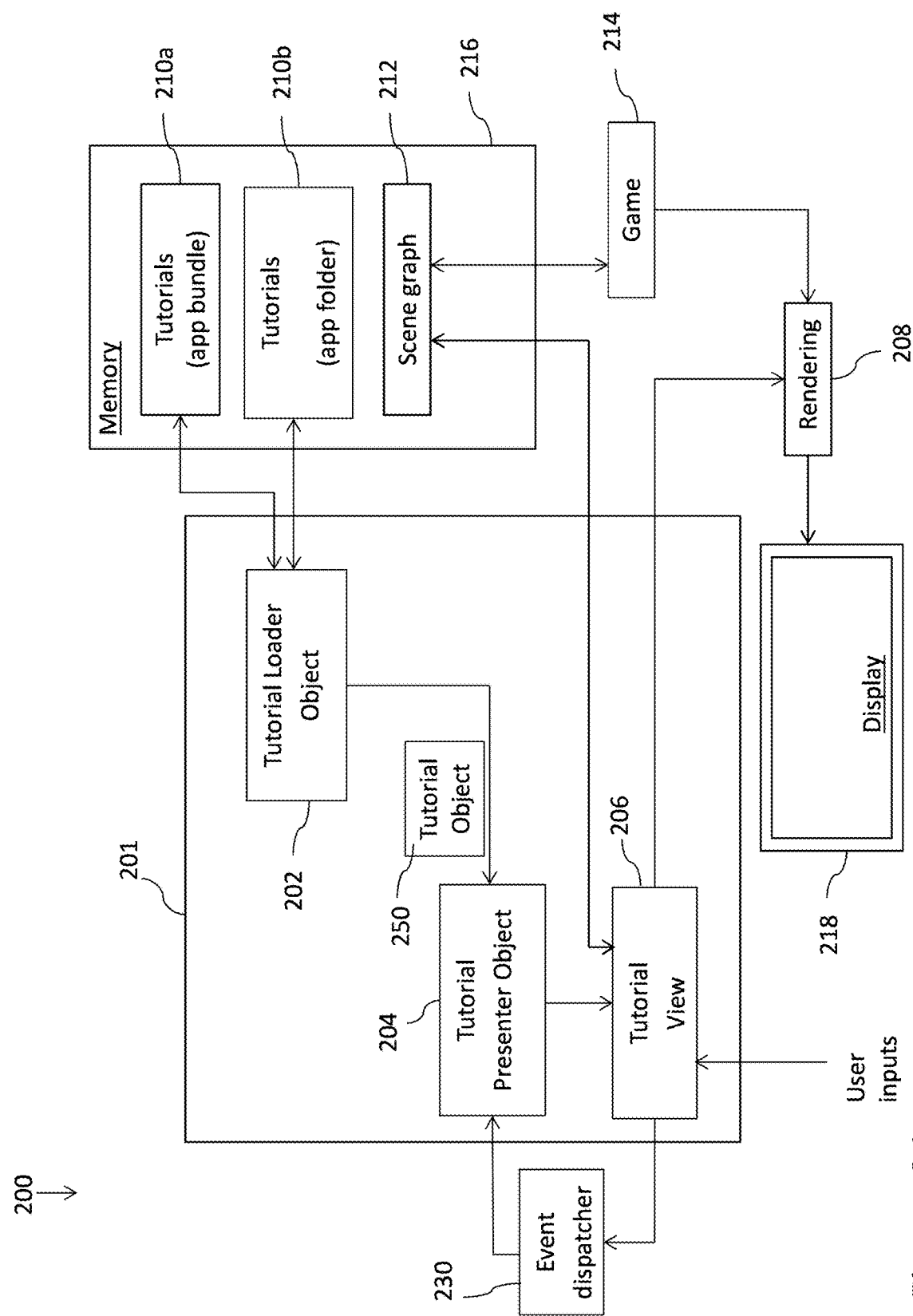
FIG. 2A is a functional block diagram of a part of a user device.

FIG. 2A is a functional block diagram showing the functionality of a part of the user device 200 on which the game app is executed.

1. Inside the code (for the game), the tutorials (external XML files) are loaded by a TutorialLoader object into a Tutorial object. For example, one tutorial may be loaded by each level as and when it is needed.
2. The Tutorial object is fed to a TutorialPresenter object; the TutorialPresenter object is responsible for handling the tutorial flow, i.e. the transitions between the sequential steps of each tutorial (e.g. as shown in FIG. 1D).
3. The TutorialPresenter makes use of a Tutorial View—the frontend object that shows the step graphics and instructive text to the user. The Tutorial View also receives user input.
4. On receiving the user input, the user input information is passed on to lower layers, to determine the next step that is to be shown in the sequence.

FIG. 2A shows a (generic) tutorial system 201 comprising various components (functional blocks) 202-206 that represent functionality implemented by the game app when executed the processor(s) 406 of the user device and when operating in the tutorial mode. The system 201 comprises a tutorial data access component (TutorialLoader object/tutorial access component), 202 a tutorial controller (TutorialPresenter object) 204, and a tutorial interface component (Tutorial Viewer) 206. FIG. 2A also shows an event dispatcher (EventDispatcher) 230, a game component 214 and an image rendering component 208, which also represent functionality of the game app when executed on the processor(s) of the user device.

The tutorial access component can access both a first location in local memory 212 of the user device and a second location in the local memory 212 as denoted by the relevant two-way arrows in FIG. 2A. The first location holds an app bundle (app package) 210a of the game app and the second location holds an app folder associated with the game app, both of which can hold tutorial data, in the form of a tutorial file (e.g. XML ("eXtensible Markup Language") file) for use in delivering tutorials to the player, from which tutorial data the tutorial access component 202 can generate one or more tutorial objects 250 (Tutorial objects). The tutorial access component 202 has an output coupled to a first input of the tutorial controller 204, by which the tutorial access component 202 can provide the generated tutorial object(s) to the tutorial controller 204. The tutorial controller 204 has an output coupled to a first input of the tutorial interface component 206, by which the tutorial controller 204 can control the tutorial interface component 206 to output tutorial-related information to the player in effecting a tutorial flow. The tutorial interface component 206 has a first output connected to a first input of the rendering component 208, by which the interface 206 can supply tutorial display data for displaying tutorial-specific information on the display 218 of the user device 200 as images. The tutorial-specific information is specific to the tutorial mode and can include tutorial-related text and/or graphics (e.g. of a cartoon character) such as that described above (e.g. 24/25 in FIG. 1D). The event dispatcher 203 has an input connected to a second output of the tutorial interface component 206 and an output connected to a second input of the tutorial controller 204.

The game component 214 and the tutorial view component 206 can each access a game scene data structure in the form of a game scene graph 212 held in the memory 216 of the user device 200, as illustrated by the relevant two-way arrows in FIG. 2A.

Scene graphs are known in the art. A scene graph is a structure that arranges a logical representation of a graphical scene. A scene graph is a collection of nodes in a graph or tree structure. Any particular tree node (in the overall tree structure of the scene graph) may have many children but typically (but not exclusively) only a single (immediate) parent, with operations performed on a parent notes generally having effects that propagate to all its child nodes, which in turn may have effects that propagate to their children if any etc. Edges thus represent behavioural dependences of the child nodes on their immediate parent node (and any grandparent nodes). A node may, for instance, represent an element to be displayed (e.g. a particular graphic), or it may represent a property of its children (e.g. dynamic property). For example, children of a parent node may represent planet graphics to be displayed, with that parent representing rotational movement of its child planets, and its own parent representing a star graphic about which those planets are rotating.

Figure 6A:
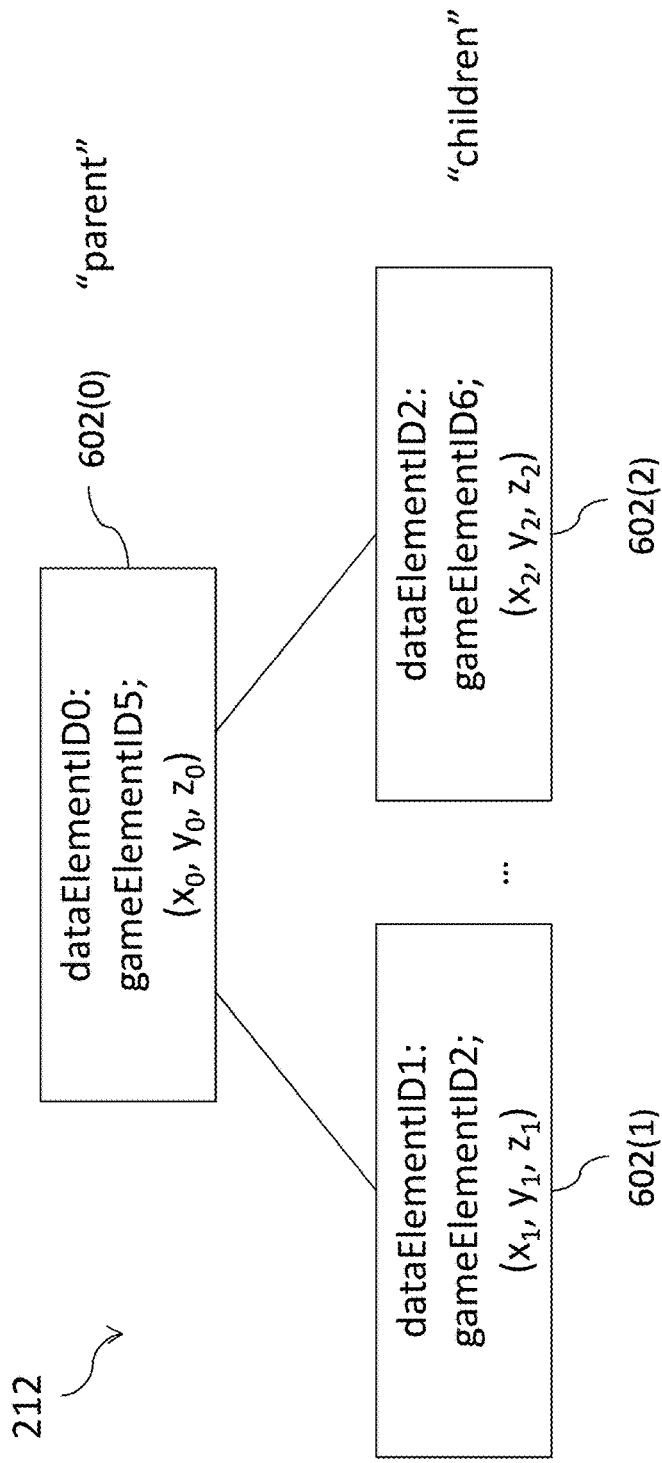
FIG. 6A is a schematic illustration of a game scene data structure.

As shown in FIG. 6A the game scene graph 122 comprises a plurality of data elements (scene objects) in the form of graph nodes 602, each containing a respective data element identifier (scene object identifier) e.g. name, position or other suitable identifier that distinguishes it from other data elements—in this case, node identifier—that identifies that graph element—in this case, that node. The nodes contain display data for displaying game elements. For example, for at least some nodes, layout information in the form of Cartesian coordinates (x, y, z) could define a position on the display at which a particular game element (e.g. a particular card such as a red 2 or a black queen, or a particular type of candy, or a particular card or card-related element)—for instance identified by a game element identifier contained in that node—is to be displayed, with "(x, y)" specifying a point in the plane of the display and "z" (z-coordinate/Z coordinate) specifying a relative "position" in a direction perpendicular to the display, which can be configured to control how game objects (game elements) are displayed when overlapping e.g. with higher-z objects being displayed "on top" of lower-z objects. For instance a scene graph may be provided for displaying game elements 20 on a game board 2; certain nodes may each correspond to a particular position on that board (e.g. so that each is displayed in a different tile 22), with that node defining a particular type of game element (e.g. particular variety of candy) to be displayed on the board at that location.

As another example, in the case of the pyramid solitaire game described above, scene objects may identify: game elements in the form of particular playing cards (e.g. a black 2, red king etc.) to be displayed at different card positions on the card table 908 defined in the scene objects; the deck pile 904 to be displayed at a particular deck pile location; and a current active card 902 to be displayed at a particular active card location. In the case of the active card node, that node is identified by a name such as "ActiveCard" contained therein—as will be apparent in view of the above description of this game, the actual card game element being displayed as the active card changes as the user plays the game which can be effected e.g. by modifying the game element identifier in the ActiveCard node as the game progresses. Similarly, the deck pile node is identified by a name such as "DeckPile" contained therein, and may contain either an identifier of a deck pile game element (which may change, for instance, when the deck of cards runs out to convey that fact). The nodes defining the various pyramid cards 906 may are identified by respective a card location, e.g. a particular pyramid card node may be identified as corresponding to card position "45", and may have an element identifier of a specific cart (e.g. red 2, black queen) currently occupying that position.

Some nodes may not define game elements to be displayed, but may act e.g. a placeholder nodes to control relationships between other nodes (e.g. z-ordering of nodes) that do define game elements to be displayed.

In this case, the z-coordinate of a child node is defined relative to its immediate parent. That is, nodes contain relative Z coordinates; children nodes inherit Z coordinates from their parents and can apply either negative, no or positive Z translation. So for a child node 602(1) ("childNode") having an immediate patent 602(0) ("parentNode"), that child node 602(1) may associated with a relative z-coordinate "childNode.z=Zrel" rather than an absolute (that is, the "actual") z-coordinate per se; the absolute z-coordinate at which it that child node is displayed ("childNode.absoluteZ") is then given by "childNode.absoluteZ=parentNode.absoluteZ+Zrel"—that is "Zrel" higher (resp. lower) than the absolute z-coordinate of its parent ("childNode.z") when "Zrel" is positive (resp. negative). Thus, any game elements defined by child nodes are displayed in front of (resp. behind) any game elements defined by their parents when "Zrel" is positive (resp. negative). Modifying the z-coordinate of a particular node by an amount has a knock-on effect of modifying, by that same amount, the absolute z-coordinates of any children, grandchildren etc. which that particular node has, thereby bringing forward or moving backward the game elements defined by those nodes (if any) on the display.

Figure 6B:
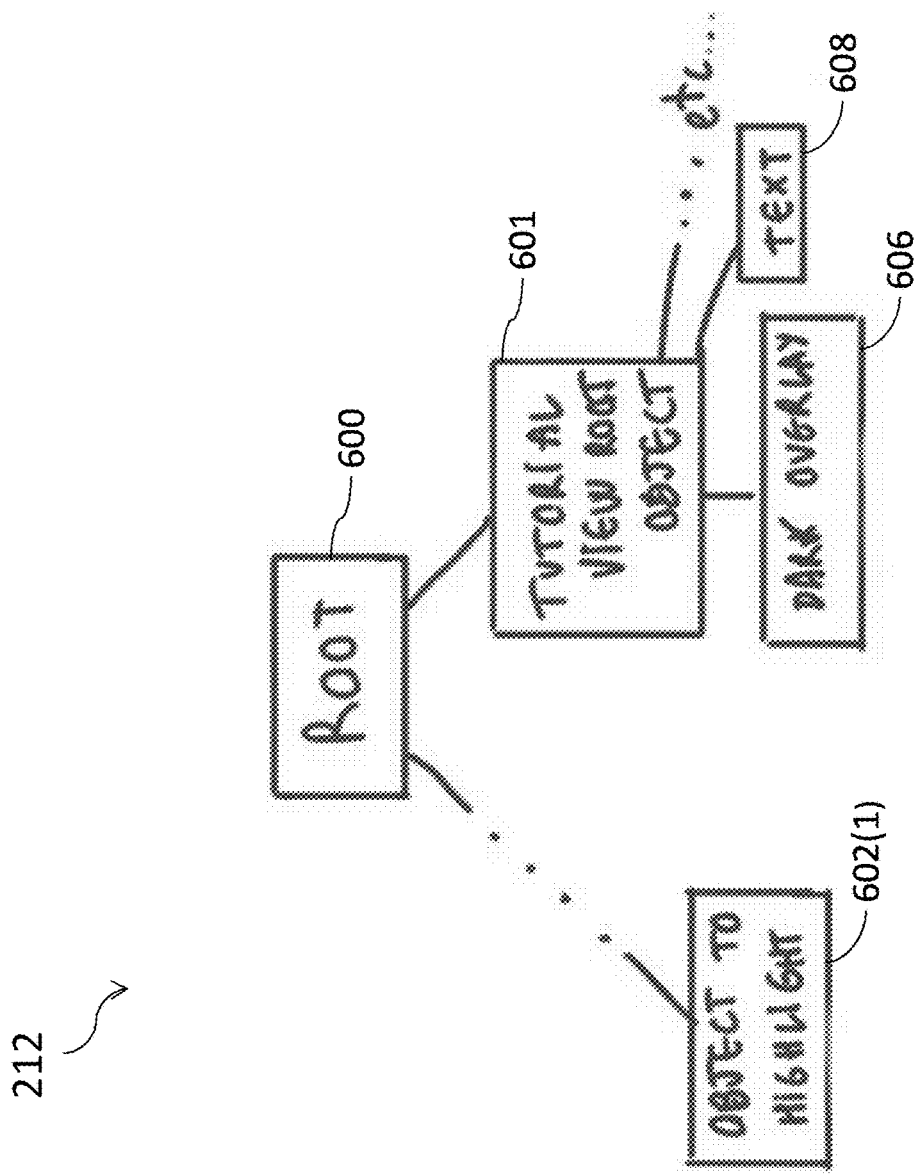
FIG. 6B is another schematic illustration of a game scene data structure.

Unlike "z" (that is, the relative z-coordinate property), in general "absoluteZ" (that is, the absolute z-coordinate property) is not an inherent property of the object and is computed when needed. An exception is the root node 600 which has an inherent absolute z-coordinate of 0 in this example (with absolute z-coordinates of the remaining noes ultimately being defined relative to this). FIG. 6B illustrates the hierarchical structure of the scene graph 212 at a point in time where tutorial views are attached to the graph. At the top of the hierarchy, there is a root node 600 from which all other nodes descend, including the to be highlighted node 602(1), which is connected to the root node 600 via zero or more intermediate nodes as indicated by the dotted line between the nodes 600 and 602(1) in FIG. 6B. Attached to the root node 600 (as a child of the root node 600) is a tutorial view root node 601, to which are attached any nodes that are specific to the tutorial mode, such as a dark overlay node (DarkOverlay) 606 and a tutorial text node 608. The dark overlay node 606 contains display data (including relative z-coordinate data) for displaying a dark overlay in a tutorial scene that spans substantially all of that tutorial scene when displayed, thereby at least partially obscuring any game elements defined by nodes having a lower absolute z-coordinate than the overlay node 606. The tutorial text node 608 contains display data (including relative z-coordinate data) for displaying tutorial text such as instructions in the tutorial scene (e.g. 25, 25', 25" in FIG. 1A).

Returning to FIG. 2A, the game component game component 214 has an output connected to a second input of the rendering component 208, by which the game component can supply game display data for displaying (generic) game-related information as images (e.g. in the above example, the game elements 2, the game board 20, the game tiles 22 etc.). The game-related display information is relevant, but not, specific to the tutorial mode and may also be displayed in the play mode where applicable.

The rendering component 208 is configured to render images, and to control the display 218 to display the rendered images. The images to be displayed are generated in dependence on both the tutorial-specific display information and the game-related information and constitute tutorial scenes as images that are outputted to the user in delivering the tutorial (by displaying those images on the display 218).

The tutorial interface component 206 operates at a user interface layer of the app and has a second input connected to receive user inputs from one or more input devices (e.g. touchscreen) of the user device 200, by which the user can progress the tutorial flow by engaging with the tutorial scenes on the display 218, which it selectively conveys to lower layers (below the user interface level) of the game app. In particular, the tutorial interface component 206 selectively passes inputs to the event dispatcher (which operates below the user interface layer), responsive to which the event dispatcher 230 interacts with other component(s)—such as the tutorial controller 204—to progress the tutorial accordingly.

A tutorial is composed of sequential steps. Each step can show images, text and highlight some of the objects of a (current) scene. Transition to the next step can be configured to be triggered by tapping anywhere or by tapping only on one of the highlighted objects (depending on which is specified in the tutorial data for that step).

Tutorials are defined on external XML files (one example of tutorial data) with a concrete format, where all the steps are specified with their texts, images and highlighted objects.

Figure 5:
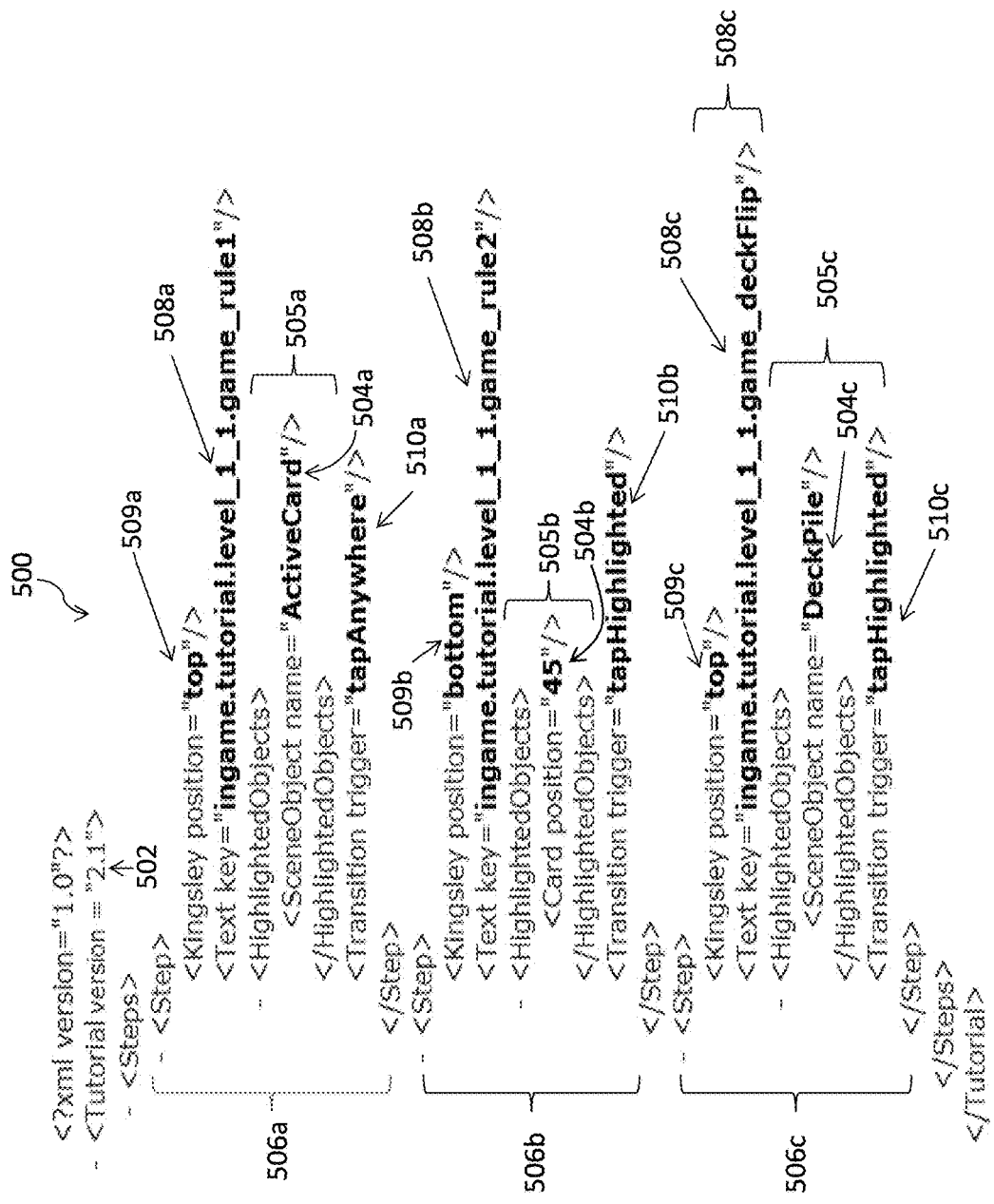
FIG. 5 is a schematic illustration of tutorial data for use in outputting a game tutorial.

An example of a tutorial file 500 is illustrated in FIG. 5, which is for delivering a tutorial for the pyramid solitaire game described above. In this example, the tutorial data is in the form of an XML file with different XML tags being used to define entries. The file comprises a version identifier 502 (e.g. in the form "x.x" or "x.x.x" etc. where x is numerical) which identifies a version number of that file. The file comprises step entries 506a, 506b, 506c, each of which defined a different step of the tutorial. For each step 506, a respective tutorial scene is outputted to the user. In particular, for each tutorial step 506 shown in FIG. 5, a scene object is identified for highlighting by a scene object identifier (data element identifier) 504 in a highlighted object field 505 of that step field 506. Additional graphics (e.g. images and/or text) to be displayed in the tutorial scene defined by that step 506 are identified by graphics identifier(s) 508 with layout information 509 (such as z-coordinate information) specifying where that graphic is to be displayed. In addition, a required user action is defined by a respective action identifier 510. The required action must be performed in order to progress (transition) from the tutorial scene to a new displayed scene (that is to progress from one step e.g. 506a to the next step e.g. 506b, or to complete the tutorial at the last step e.g. 506c).

A tutorial file may be associated with a tutorial identifier that distinguishes it from any other tutorial files (for other tutorials) held in memory.

The scene object in the scene graph identified for highlighting (by identifier 504) contains display data for displaying a particular respective game element; as explained in more detail below, identifying a particular scene object in the tutorial file (e.g. using scene object identifier 504a, 504b, 504c) at a particular step (506a, 506b, 506b) in this manner causes that respective game element to be displayed as a highlighted game element at that step. For step 506a, the scene object identifier 'Scene Object name="ActiveCard' (which is a name in this case) 504a causes the current active card (902 in FIG. 9) to be highlighted at that step 506*a*. For step 506*b*, the scene object identifier 'Card position="45"' 504*b* (which is a unique position in this case) causes the pyramid card at position "45" (one of cards 906 in FIG. 9) to be highlighted at that step 506*b*. For step 506*c*, the scene object identifier 'Scene Object name="DeckPile"' (which is a name in this case) 504*c* causes the deck pile (904 in FIG. 9) to be highlighted at that step 506*a*.

In the case of step 506*a*, the required action is the user engaging with the respective tutorial scene displayed at that step by tapping anywhere in that scene, as specified by 'Transition trigger="tapAnywhere" action identifier 510*a*; for steps 506*b* and 506*c*, the user must engage with the highlighted game element specifically (not just the scene in general) by tapping that highlighted game element (the card at position 45 and the deck pile for steps 506*b* and 506*c* respectively), as specified by the 'Transition trigger="tapHighlighted"' identifiers 510*b*, 510*c*.

Inside the code the tutorials are loaded by the TutorialLoader object into a Tutorial object 250.

The tutorial object represents a current tutorial being delivered to the player by progressing through the tutorial steps (e.g. S102-S110 in FIG. 1D) in response to the user properly engaging with corresponding tutorial scenes (e.g. 122-139).

The Tutorial object is fed to (that is, input to) the TutorialPresenter object 204 which is responsible for handling the tutorial flow, showing it, transitioning between steps and hiding it when appropriate. In order to actually show the different steps the TutorialPresenter makes use of the TutorialView 206, which is a front-end object that shows the actual step graphics and text to the user. The TutorialView also gathers the user's touch input.

As stated before, the tutorial steps can highlight objects already present on the scene.

For example, a game scene graph may be generated substantially as it would be generated as part of normal play mode operation for the purposes of displaying game elements in a game scene (as illustrated in FIGS. 1A and 1B), but then additional highlighting data may be generated (by the tutorial controller 204) for selectively highlighting one or more of those elements on the display in a tutorial scene instead of a game scene (as illustrated on the right-hand side of FIG. 1D). As discussed in more detail below, in particular embodiment the highlighting data is used to modify the scene graph 212 to effect the desired highlighting.

Figure 2B:
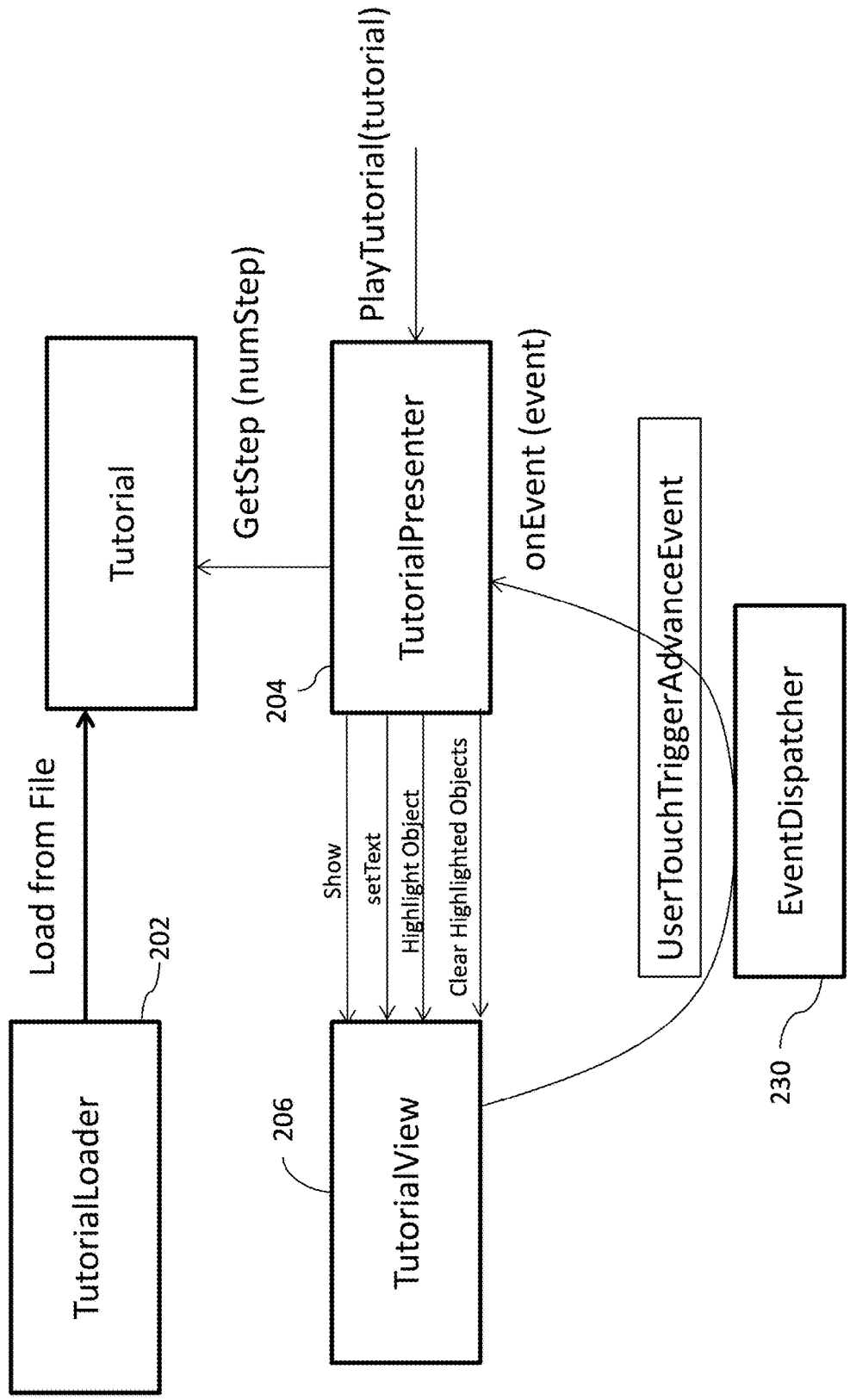
FIG. 2B is a class interaction diagram that illustrates certain interactions between some of the components of FIG. 2A.

The manner in which some of the components of FIG. 2A interact is depicted FIG. 2B, which is a class interaction diagram illustrating certain interactions. The TutoriaLoader 202 loads the tutorial file (500, FIG. 5) for a particular tutorial from memory into the tutorial object 250. The TutorialPresenter 204 is responsive to a tutorial instigation signal identifying that tutorial ("PlayTutorial(tutorial)") to effect the outputting of that tutorial to the player 402. That signal may be generated e.g. responsive to reaching a new game level for which a tutorial is required before proceeding with the game. The tutorial present identifies to the TutorialView object 206 graphics, text etc. to be displayed in a particular tutorial scene of the tutorial and also identified any scene objects to be highlighted in that scene, which the TutorialView object causes to be displayed. The TutorialView object causes highlighting of game elements on the display by modifying the scene graph 212 in the manner described below.

The TutorialView object 206 also selectively passes user inputs to the EventDispatcher 203. Such inputs are only so passed if they satisfy one or more user engagement criteria for that scene (as define in the tutorial file). In response, the EventDispatcher 230 triggers one or more events. The TutorialPresenter is responsive to these event(s) and may, for instance, progress the tutorial scene by obtaining information for the next step ("numStep") from the Tutorial object 250 (as illustrated by the arrow labelled "GetStep (numStep)") and controlling the TutorialView object 206 to display that next step accordingly.

To begin a tutorial (that is, responsive to entering the tutorial mode), a tutorial view root scene object (601, FIG. 6B) can be inserted (by the Tutorial View object 206) into the scene graph with tutorial specific scene objects 606, 608 etc.—generated based on the tutorial file definition—attached as children. The tutorial view root object 601 acts as a wrapper for the tutorial-specific scene objects 606, 608 etc. In this manner, tutorial-specific elements (defined by nodes 606, 608 etc.) can introduced into a game scene to create a tutorial scene on the display 218.

A method of selectively delivering a game tutorial using highlighted game elements be described with reference to FIG. 3.

Figure 3:
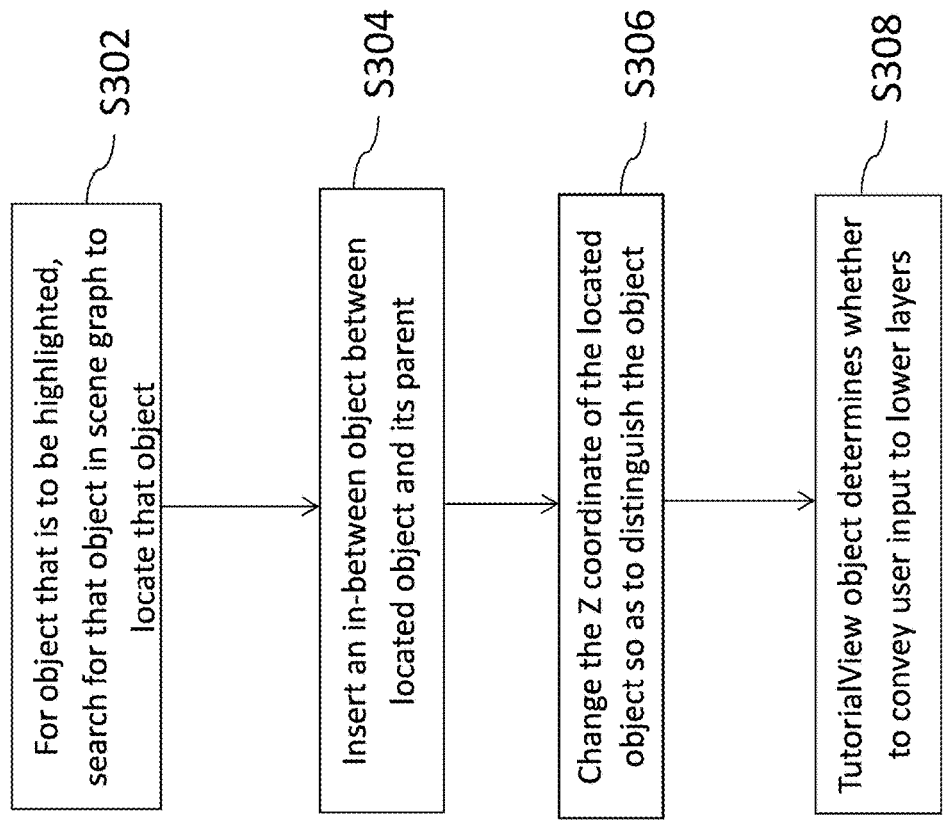
FIG. 3 is a flowchart for a method of selectively highlighting game elements in outputting a game tutorial.

FIG. 3 illustrates how game objects already present on the scene (i.e. current game board) are localized (located) and highlighted using the information contained in the tutorial file (i.e. the game objects are agnostic to the tutorial). The method involves the following operations:

1. Search entire scene graph (i.e. current game board, or deck on display) for object named in tutorial file.
2. For a localized (i.e. found) object, insert an in-between object between the localized object and its parent; change the z-coordinate of the localized object to show it over the dark overlay that covers the rest of the scene.
3. To restrict user interaction to highlighted objects, TutorialView can determine whether to pass on user input information to the lower layers (e.g. TutorialPresenter object).

This highlighting is performed in a non-intrusive way, where the actual scene object doesn't know anything about the tutorial. Objects to highlight are specified by their names in the tutorial file and then searched for in the entire scene graph (S302). Other domain-specific searching functions can be easily added by extending the file format and implementing the proper finders; in Pyramid Solitaire a card finder can be used in order to easily highlight specific cards (which are dynamically created) on the table.

For example, tutorial step 506*a* (resp. 506*c*) in FIG. 5 specifies identifies the node named "ActiveCard" (resp "DeckPile") for highlighting. To output step 506*a* (resp. 580*c*), the graph 121 is thus searched for the node named "ActiveCard" (resp. DeckPile) in order to highlight the currently active card 902 (resp. the deck pile 904) on the display, for which that node contains display data. Similarly, the tutorial step 506*b* in FIG. 5 identifies the node that corresponds to card position 45. To output step 506*b*, the graph 121 is searched for the node identified as corresponding to card position 45 in order to highlight the card displayed on the display (one of cards 906), for which that node contains display data.

When an object to be highlighted is localized (located) an in-between object is inserted (S304) in the hierarchy between it and its parent (this allows to preserve the scene object original state), and its Z coordinate is changed (S306) to show it over a dark overlay that covers the rest of the scene in the following manner.

Figure 6C:
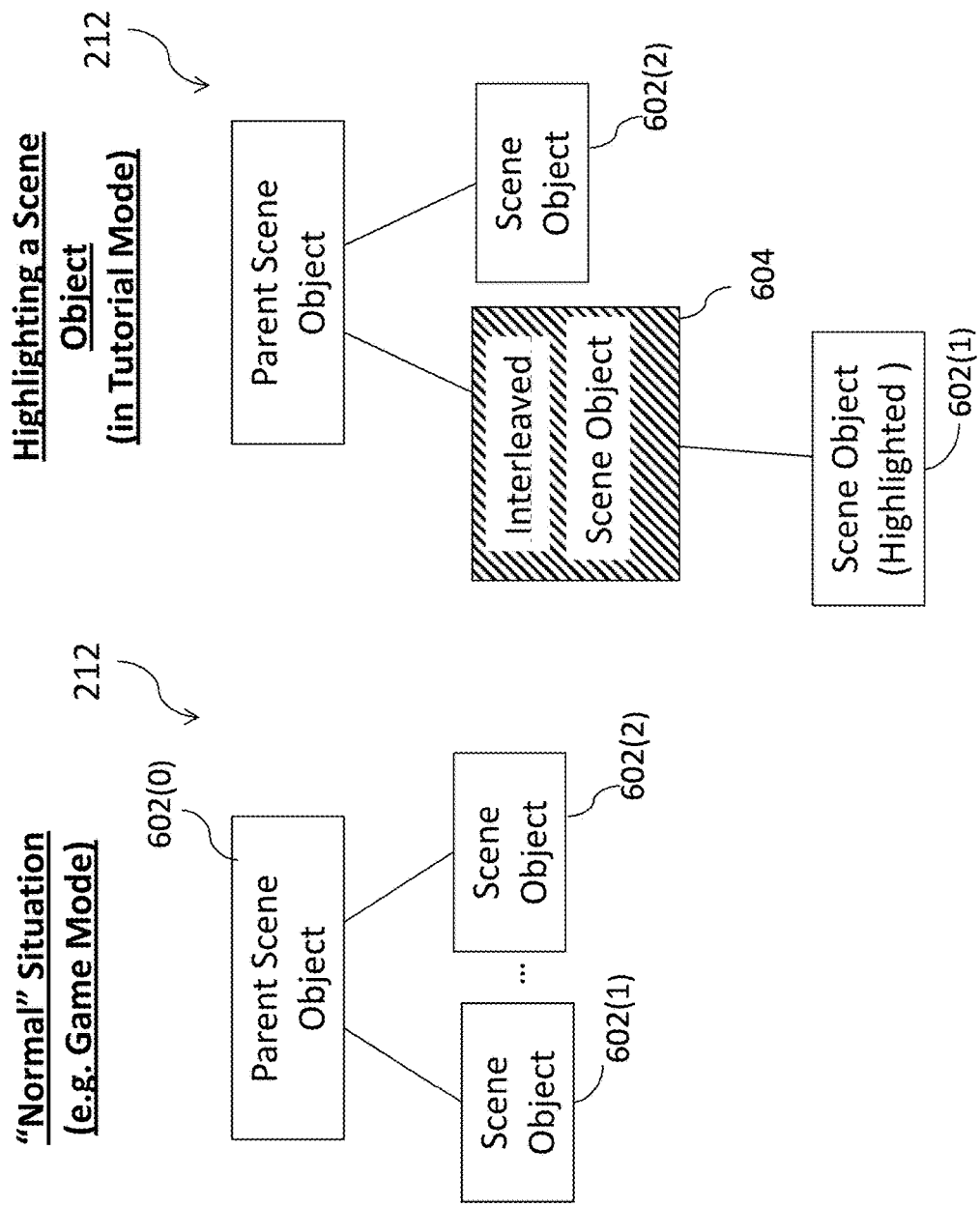
FIG. 6C illustrates how a game scene data structure may be modified to highlight a game element.

The process is illustrated schematically in FIG. 6C, which shows a parent node 602(0), and a first 602(1) ("highlightedObject"—that is, to be highlighted), and a second node 602(2) which are child nodes of the parent node 602(0) of the scene graph 212. The left hand side of FIG. 6C shows a scene graph configured for displaying a "normal" scene (e.g. as might be displayed when operating in the game play mode) in which no objects are highlighted. The right hand side shows the same scene graph 212 but modified to include an interleaved scene object 604 in between the first scene node 602(1) and the parent node 602(0), with the interleaved node 604 thus being a child of the parent node 602(0) and itself a parent of the first node 602(1). The interleaved node does not define any game elements to be displayed per se, but rather acts as a placeholder node to control the manner in which a respective game element defined by node 602(1) is displayed. This is explained below.

In order to highlight the first scene object 602(1) (that is, in order to display the respective game element defined by the first scene object 602(1) as highlighted on the display 218), TutorialView 206 draws a dark overlay with an higher Z coordinate than all the scene objects. This can be achieved by inserting an overlay scene object ("darkOverlay", containing display data for displaying that overlay—606, FIG. 6B) with a sufficiently high z-coordinate into the scene graph 212.

In order to highlight the first scene object 602(1), the (to be) highlighted scene object 601(1) is 'moved' over that overlay, whilst preserving all the object properties (of other objects e.g. 602(0) and 606(2)) intact in order to restore subsequently restore the scene to its original from. The steps are as follows:
1. Locate the object in the scene 602(2), usually referenced by name (or alternatively by e.g. card position etc.);
2. Create a new "interleaved" object 604 and attach it to the same parent 602(0) as the (to be) highlighted object 602(1);
3. Detach the (to be) highlighted object from its parent 602(0);
4. Attach the (to be) highlighted object to the new "interleaved" object 604 (right hand side of FIG. 6C);
5. Set the Z coordinate of the interleaved object higher than the dark overlay by a suitable amount. The z-coordinate of the highlighted node 602(1) is defined relative to its parent (now the interleaved node); thus, this also brings the node 602(1) forward. The amount by which the z-coordinate of the interleaved object is brought forward is sufficiently high to bring the node 602(1) in front of the overlay as desired, thereby causing the respective game element defined by that node 602(1) to be displayed in front of the overlay on the display 218.

To aid understanding, the following example is considered in which it is assumed that the tutorial view root object 601 has Zrel=800, which is also its absolute Z coordinate because it is attached to the scene root object (having an absolute Z=0). The dark overlay object 606 might have Z=0, so its absolute Z coordinate would be 800. Other objects, such as the text object 608, have greater Z values (e.g. Z=20) so that e.g. the text defined by that object appears over the dark overlay (with an absolute Z of 820).

In order to make the highlighted object appear over the dark overlay, its absolute Z coordinate is set a bit higher than 800, e.g. 810. To do that, the difference between the absolute Z coordinates of the dark overlay object 606 and the highlighted object 602(1) is computed as darkOverlay.absoluteZ−highlightedObject.absoluteZ+10
and that value is set as the relative Z coordinate of the interleaved object:
interleavedObject.z=darkOverlay.absoluteZ−highlightedObject.absoluteZ+10 thereby causing highlightedObject.absoluteZ to become darkOverlay.absoluteZ+10=810 when it is attached to the new interleaved object.

When the object 602(1) has to be restored (that is, to revert to the normal scene again), it is simply detached from the interleaved object 604 (which can now be removed) and attached once again to its original parent 602(0). As the object's z-coordinate is defined relative to its parent (now node 602(0) once again) and is unchanged throughout the highlighting procedure, the scene graph reverse to exactly its original form (left hand side of FIG. 6C), with the object 602(1) automatically reverting to its former z-location in the scene. The overlay object 606 can also be removed from the scene graph. In order to restrict interaction to highlighted objects in a non-intrusive way (that is, without modifying them at all) the Tutorial View object only passes (S308) user touches (inputs) to lower layers under certain conditions.

For example, user input may only be passed to the lower layers if they satisfy one or more predefined tutorial mode engagement criteria e.g. only if the user engages with highlighted elements in a manner in which they have been instructed.

Specific tutorials can be specifically played at certain points, but they can also be automatically played for each level that has a tutorial defined for it, making it very easy to add new tutorials to levels without having to touch the code.

When a user input is allowed to pass to lower layers, it causes the relevant game elements to me modified in accordance with the rules of the game (see above). For instance, where the allowed input switches game elements to form a three-way match, the game app progresses in the manner described above with reference to FIGS. 1A-1C i.e. just as it would had the allowed input been received as part of normal play in the game play mode.

As mentioned, in some tutorials the user is only allowed to tap (or otherwise select) on a highlighted object in order to continue. The idea is to be able to restrict interaction to highlighted objects in a non-intrusive manner, that is, without altering the normal objects touch handling code (or in general user input handling code).

To do this the Tutorial View captures all the touch input and only allows touches to be propagated to the normal scene in a certain way. The goal is to let highlighted objects respond to touch events with its correct behaviour (i.e. "normal" behaviours, as it would in the game mode) while preventing the rest (i.e. the non-highlighted objects) from processing touch input at all. To make this possible the following rules are used:
When the touch event is TOUCH DOWN (the user just touched the screen with their finger):
    If the touch position is inside the highlighted object, pass the event;
    Otherwise block it.
When the touch event is TOUCH MOVED (the user moved their finger while touching the screen):
    If the start touch position (the touch keeps track of where a touch gesture began) is inside the highlighted object pass the event;
    Otherwise block it.
When the touch event is TOUCH_END (the user just stopped touching the screen)
    If the start touch position (the touch keeps track of where a touch gesture began) is inside the highlighted object pass the event;
    Otherwise block it.
E.g. if the user starts touching a highlighted button, he can drag his finger out of it and even release it, and the button will continue to process those touch events allowing it to be displayed correctly its pressed/non-pressed states. On the other hand, if the user touches directly any of those positions outside the button, no other button will be clicked because no touch event will be propagated down.

Upon completion of a tutorial (e.g. responsive to switching to the game play mode), the tutorial view root object 601 can be removed along with all of its children (606, 608).

The above-described techniques allow designers to easily define as many tutorials as they want without programming intervention.

Rather than bundling and distributing every tutorial with a new version of the application (which usually requires passing through a submission and approval process which can take sensible time), in some implementations the network-based system depicted in FIG. 4 is used to add and update tutorials directly from the server 420, allowing very quick response time to player difficulties understanding some level or feature. This exploits the fact that tutorials are implemented by a generic tutorial system of the app, such that new tutorial updates can be downloaded and used without any modification to the app code itself.

On the server side the setup consists in storing the tutorial bundle with its version number and exposing methods (that is, update interfaces visible to the user device) for the app to check the version number and download the tutorial bundle if necessary.

Figure 7:
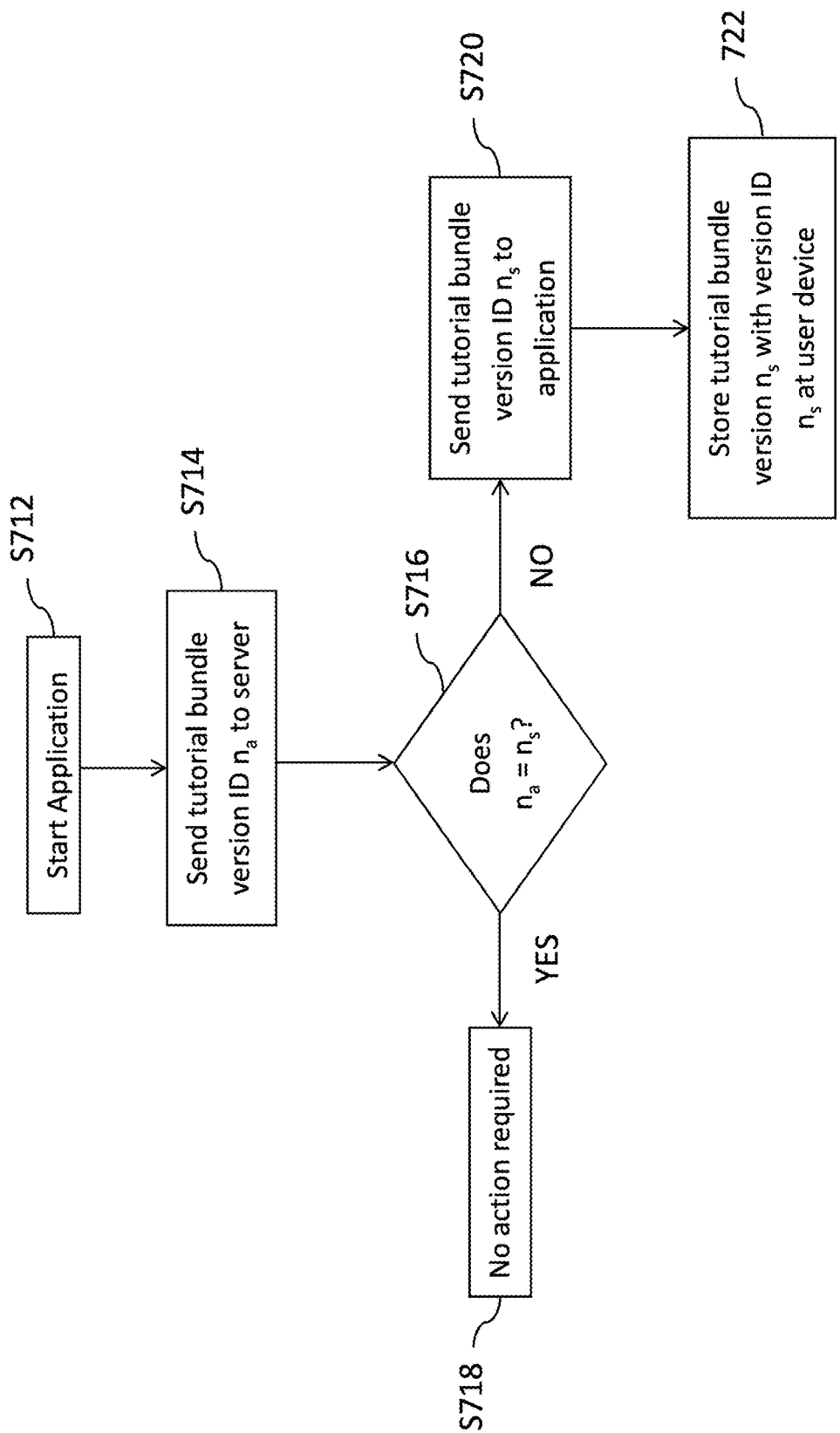
FIG. 7 is a flowchart for a method of updating tutorial data for delivering a game tutorial.

A method of updating tutorial data for delivering a game tutorial will now be described with reference to FIG. 7, which is a flow chart for the method. The method is implemented by a combination of the game app when executed on the user device 200 and the server code 428 when executed on the server 420.

The app is bundled with a first (initial) version of the tutorials. Tutorial bundles are labelled with a version number (that is, stored in association with a version identifier). When the app launches (S712) it checks with the server if there is a new version of the tutorials, checking the local version number against the server one.

That is, the user game app transmits (S714) the version identifier of the latest version of the tutorial data held at the user device to the server. The server compares the received version identifier with the version identifier of the latest version held at the server (S716). Alternatively, the game app may request and receive the server version identifier from the server and implement the comparison of S716 locally. Either way, the app effects a comparison of its own version identifier with the server version identifier (whether or not it performs that comparison itself).

If there is a new version of the tutorials, the app downloads it (S720) and stores it (S722) in the local documents storage, overwriting any previous downloaded version present and thereby causing future tutorials to be outputted using the new version. Note that the first version of the tutorials (in the app bundle) is never overwritten because is bundled inside the app package; this allows to have at least these tutorials if the app user data (that is, the documents folder) gets cleared. As downloaded tutorials are stored locally, no internet connection is needed to play them.

On the other hand, if no new version is required because the current version at the user device is up to date, the method ends (S718).

When loading a tutorial the TutorialLoader component should be modified to searches for tutorials first on the app documents folder and then in the app bundle. This way the server can add or update only the needed tutorials, saving bandwidth.

Figure 8:
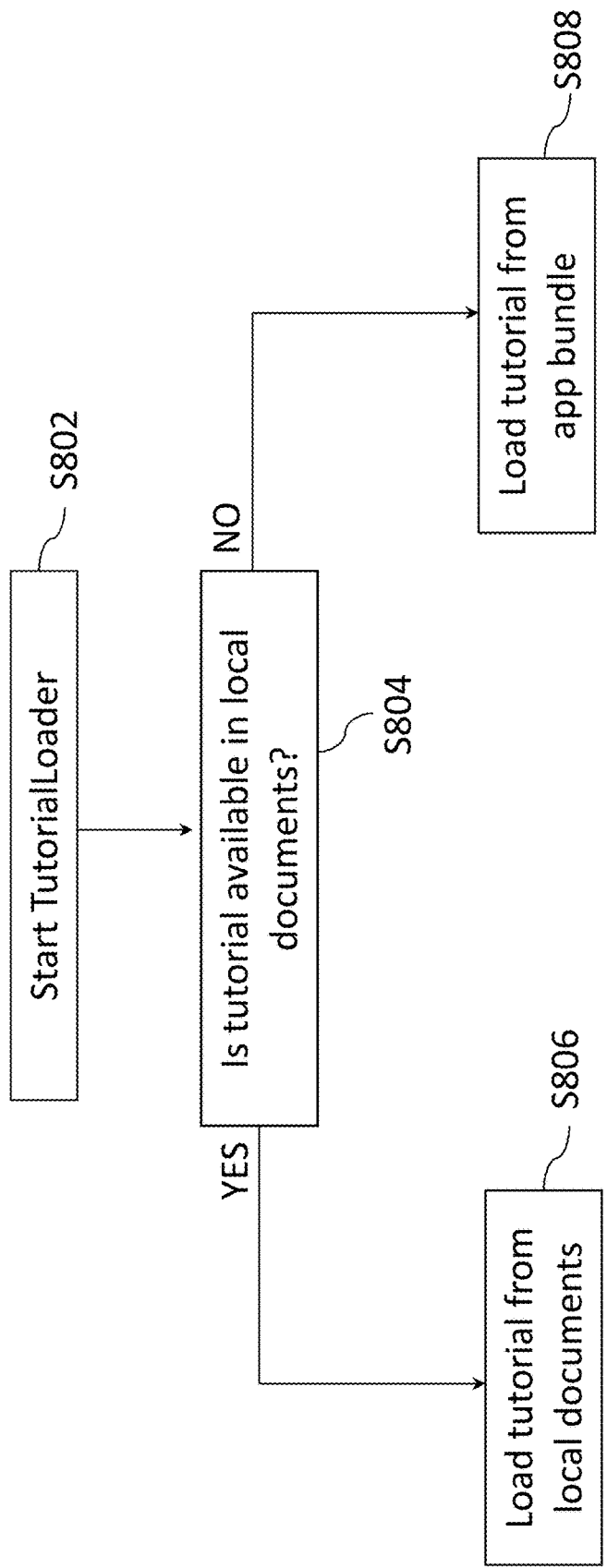
FIG. 8 is a flow chart for a method of accessing tutorial data in delivering a game tutorial.

A method of accessing tutorial data in delivering a game tutorial will now be described. The method is implemented by the game app when executed on the user device 200. FIG. 8 is referenced, which is a flow chart for the method.

At step S802, the game app begins operating in the tutorial mode and starts (instantiates) the TutorialLoader. The tutorial loader accesses the game documents folder to check whether there is a tutorial file available in that folder (S804). If so, it loads it from that folder (S806) and it is used to deliver a tutorial by the system 201. If no version is present in the game documents folder, TutorialLoader loads the initial version from the app bundle instead (S808).

It will be appreciated that the above embodiments have been described only by way of example, and other variants or applications may be apparent to a person skilled in the art given the disclosure herein. The scope is not limited by the described examples, but only by the following claims.

The invention claimed is:

1. A computer-implemented method of creating a tutorial from a game scene to display the game tutorial on a display, the method implemented by one or more processors and comprising:
   accessing from computer storage a game scene, the game scene having a plurality of display data elements, each display data element associated with a respective data element identifier, the display data elements containing display data for displaying game elements on the display in a play mode;
   accessing tutorial data from a tutorial file stored in the computer storage, the tutorial data comprising at least one tutorial data element identifier identifying at least one of the display data elements to be highlighted in a tutorial scene;
   searching the game scene for each display data element having a data element identifier matching the tutorial data element identifier, that data element containing display data for displaying a respective game element;
   generating highlighting data using the results of the searching step, the highlighting data for highlighting the respective game element on the display; and
   in a tutorial mode creating the tutorial scene by modifying the game scene to display the respective game element as a highlighted game element on the display in a tutorial scene using the generated highlighting data.

2. The method of claim 1 wherein the tutorial data defines a required user action that must be performed in order to progress from the tutorial scene to a new displayed scene in the tutorial mode.

3. The method of claim 2 wherein the required action is the user engaging with the highlighted game element via an input device.

4. The method of claim 3 wherein the input device is a touchscreen of the display, and the required action is the user tapping the highlighted game element.

5. The method of claim 4, comprising, in the tutorial mode, propagating the user input to the tutorial scene for the highlighted game elements, while preventing non-highlighted game elements from processing the user input.

6. The method of claim 3, comprising, in the tutorial mode, propagating the user input to the tutorial scene for the highlighted game elements, while preventing non-highlighted game elements from processing the user input.

7. The method of claim 2 wherein the required action is the user engaging with the tutorial scene via an input device.

8. The method of claim 7 wherein the input device is a touchscreen and the required action is the user tapping anywhere in the tutorial scene.

9. The method of claim 1 wherein the game scene comprises a scene graph having nodes that represent game elements and edges between parent and children nodes that represent behavioural dependencies of child nodes on parent nodes.

10. The method of claim 9 wherein the generated highlighting data is used to modify the scene graph, and the tutorial scene is generated using the modified scene graph.

11. The method of claim 9 wherein the step of searching comprises locating a node associated with the tutorial data element identifier, and the game scene is modified by inserting a new node in between the located node and its parent node.

12. The method of claim 1 wherein the display data comprises location data defining locations of game elements in the game scene, and wherein the highlighting data comprises overlay display data, which is used to display an overlay on the game scene to create the tutorial scene, and location modification data, which is used to modify z-coordinate location data of the identified game element to cause the identified game element to be displayed in front of the overlay, thereby displaying the identified game element as a highlighted game element in the tutorial scene.

13. A computer program product comprising executable code stored on a computer readable storage medium and configured when executed to implement the method of claim 1.

14. A computer device comprising:
a display;
computer storage holding (i) a scene data structure of a game scene, the game scene having a plurality of display data elements, each display data element associated with a respective data element identifier, the display data elements containing display data for displaying game elements on the display in a play mode, and (ii) a tutorial file comprising tutorial data, the tutorial data comprising at least one tutorial data element identifier, identifying at least one of the display data elements to be highlighted in a tutorial scene;
one or more processors configured to search the game scene for each data element having a data element identifier matching the tutorial data element identifier, that data element containing display data for displaying a respective game element, to generate highlighting data using the results of the searching step, the highlighting data for highlighting the respective game element on the display, and in a tutorial mode to create the tutorial scene by modifying the game scene to display the respective game element as a highlighted game element on the display in a tutorial scene using the generated highlighting data.

* * * * *